United States Patent [19]

Sakuragi et al.

[11] Patent Number: 4,849,824
[45] Date of Patent: Jul. 18, 1989

[54] OPENABLE RECORDING APPARATUS WITH MULTIPLE ROLLS OF RECORDING SHEET

[75] Inventors: Kenkichi Sakuragi; Akio Ohkubo, both of Tokyo; Keizo Sasai, Yokohama; Mitsunori Nakamura, Kawasaki, all of Japan

[73] Assignee: Canon Kabushiki Kaisha, Tokyo, Japan

[21] Appl. No.: 142,337

[22] Filed: Dec. 29, 1987

Related U.S. Application Data

[63] Continuation of Ser. No. 44,421, Apr. 30, 1987.

[30] Foreign Application Priority Data

| May 6, 1986 | [JP] | Japan | 61-102079 |
| May 9, 1986 | [JP] | Japan | 61-104707 |
| May 21, 1986 | [JP] | Japan | 61-114705 |
| May 21, 1986 | [JP] | Japan | 61-114706 |
| Dec. 18, 1986 | [JP] | Japan | 61-299847 |
| Dec. 18, 1986 | [JP] | Japan | 61-299848 |
| Dec. 22, 1986 | [JP] | Japan | 61-303864 |

[51] Int. Cl.$^4$ .................... H04N 1/21; G03G 15/00
[52] U.S. Cl. ......................... 358/296; 346/136; 355/309
[58] Field of Search ............ 346/136; 358/296; 355/35 H, 14 SH, 14 R, 3 R, 13; 354/210, 275

[56] References Cited

U.S. PATENT DOCUMENTS 2,988,973 6/1961 Bohm et al. ............... 354/210 X

FOREIGN PATENT DOCUMENTS 44-12210 6/1969 Japan.
50-7928 3/1975 Japan.
59-40759 3/1984 Japan.
60-193746 12/1985 Japan.

Primary Examiner—Clifford C. Shaw
Attorney, Agent, or Firm—Fitzpatrick, Cella, Harper & Scinto

[57] ABSTRACT

A recording apparatus has a recording device for recording an image corresponding to image information on a recording sheet, a first housing, a second housing openable relative to the first housing, a first loading portion provided in the first housing and enabling a first rolled recording sheet to be loaded thereinto, a second loading portion provided in the first housing and enabling a second rolled recording sheet to be loaded thereinto, a first conveying device provided in the first housing for conveying the recording sheet loaded into the first loading portion, and a second conveying device provided in the second housing for conveying the recording sheet loaded into the second loading portion.

24 Claims, 21 Drawing Sheets

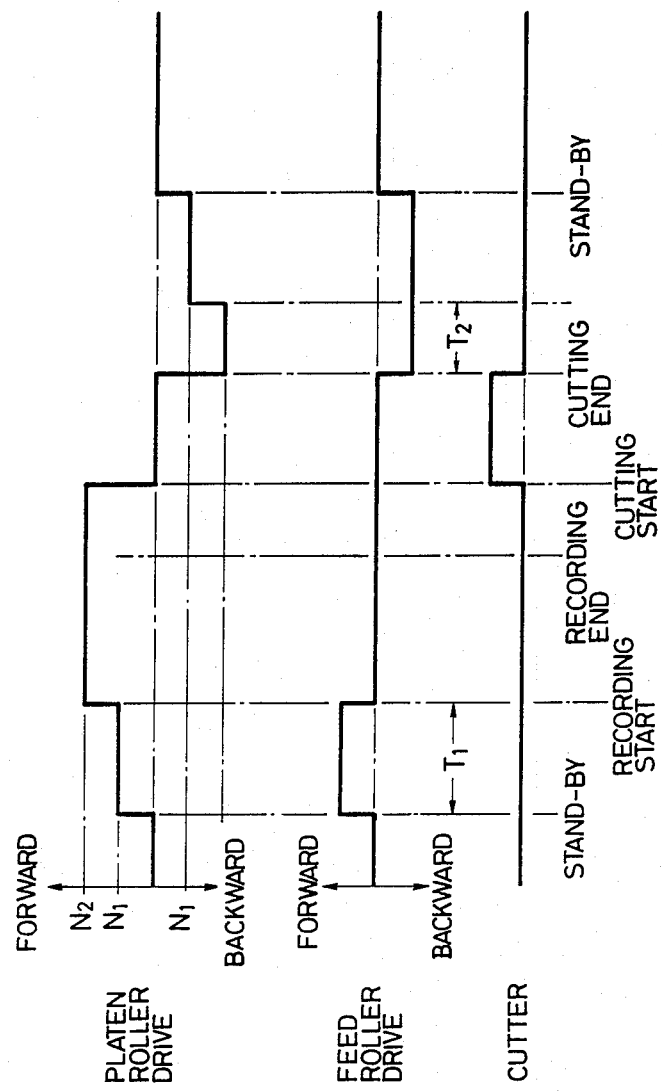

TORQUE-SPEED CHARACTERISTICS OF MOTOR

OPENABLE RECORDING APPARATUS WITH MULTIPLE ROLLS OF RECORDING SHEET

This application is a continuation of application Ser. No. 044,421 filed Apr. 30, 1987.

BACKGROUND OF THE INVENTION

1. Field of the Invention

This invention relates to a recording apparatus applicable to a facsimile apparatus, a copying apparatus or a printer, and in particular to a recording apparatus which can be loaded with a plurality of rolled recording sheets.

2. Related Background Art

A recording apparatus such as a desk, top type facsimile apparatus or printer according to the prior art is designed such that a sheet roll of predetermined size comprising a recording sheet wound in the form of a roll is contained therein and received image information is recorded while the recording sheet is paid away.

However, in the apparatus of the above -described construction, where the set recording sheet is, for example, of size A4, when image information of size B4 is to be received and recorded, it is necessary to reduce and record it. Conversely, where the set recording sheet is of size B4, when image information of size A4 is to be received and recorded, there has arisen a problem that a blank portion is created in the recording sheet.

Also, when the remaining amount of the recording sheet is small, for example, when the operator is absent during the reception at night or before a holiday or the like, it has been necessary to perform a cumbersome operation such as replacing the recording sheet roll with a new one to prevent the sheet from becoming exhausted.

Further, as a solution to such problem, there have been available so-called double roll type apparatuses which can contain two sheet rolls therein. However, the apparatuses of this kind have been of a bulky console type and have required a complicated method of setting the recording sheets, which in turn has led to difficulty in use.

SUMMARY OF THE INVENTION

It is an object of the present invention to provide a recording apparatus which can be loaded with a plurality of rolled recording sheets.

It is another object of the present invention to provide a recording apparatus which can accomplish efficient recording by the use of a plurality of rolled recording sheets.

It is still another object of the present invention to provide a recording apparatus in which the operability such as a method of loading recording sheets can be improved.

It is yet still another object of the present invention to provide a recording apparatus which is compact for its capability of being loaded with a plurality of rolled recording sheets.

It is a further object of the present invention to provide a recording apparatus in which transmission of a drive force can be accurately accomplished.

It is still a further object of the present invention to provide a recording apparatus in which jam processing is easy to do.

It is yet still a further object of the present invention to provide a recording method in which the operability when effecting recording by the use of a plurality of rolled recording sheets can be improved.

BRIEF DESCRIPTION OF THE DRAWINGS

FIG. 9A is a timing chart showing the rotational speed of a platen roller during recording.

DESCRIPTION OF THE PREFERRED EMBODIMENTS

An embodiment of the present invention will hereinafter be described with reference to FIGS. 1 to 5.

The embodiment hereinafter described in one in which the present invention is applied to a facsimile apparatus.

Figure 1:
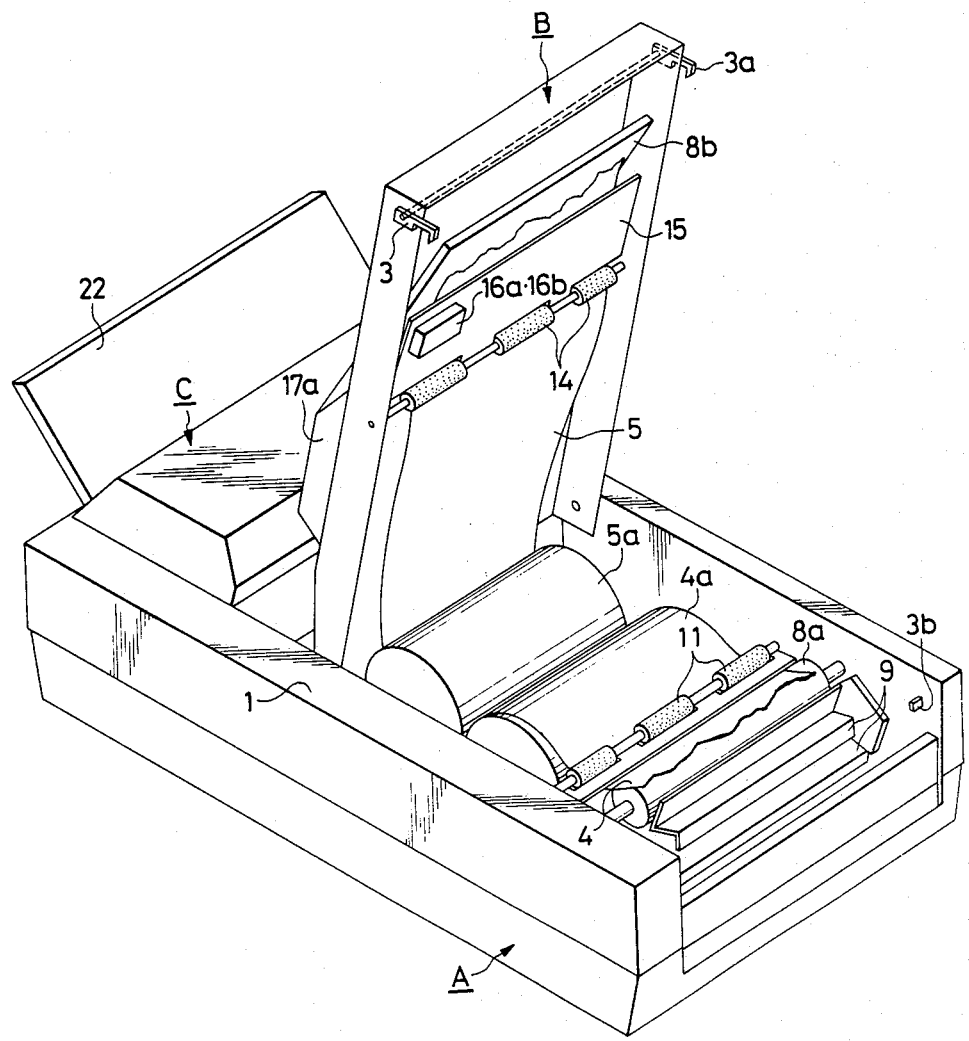
FIGS. 1 and 2 are a perspective view and a cross-sectional view, respectively, illustrating a state in which a second housing of a recording apparatus according to an embodiment of the present invention is opened.
Figure 2:
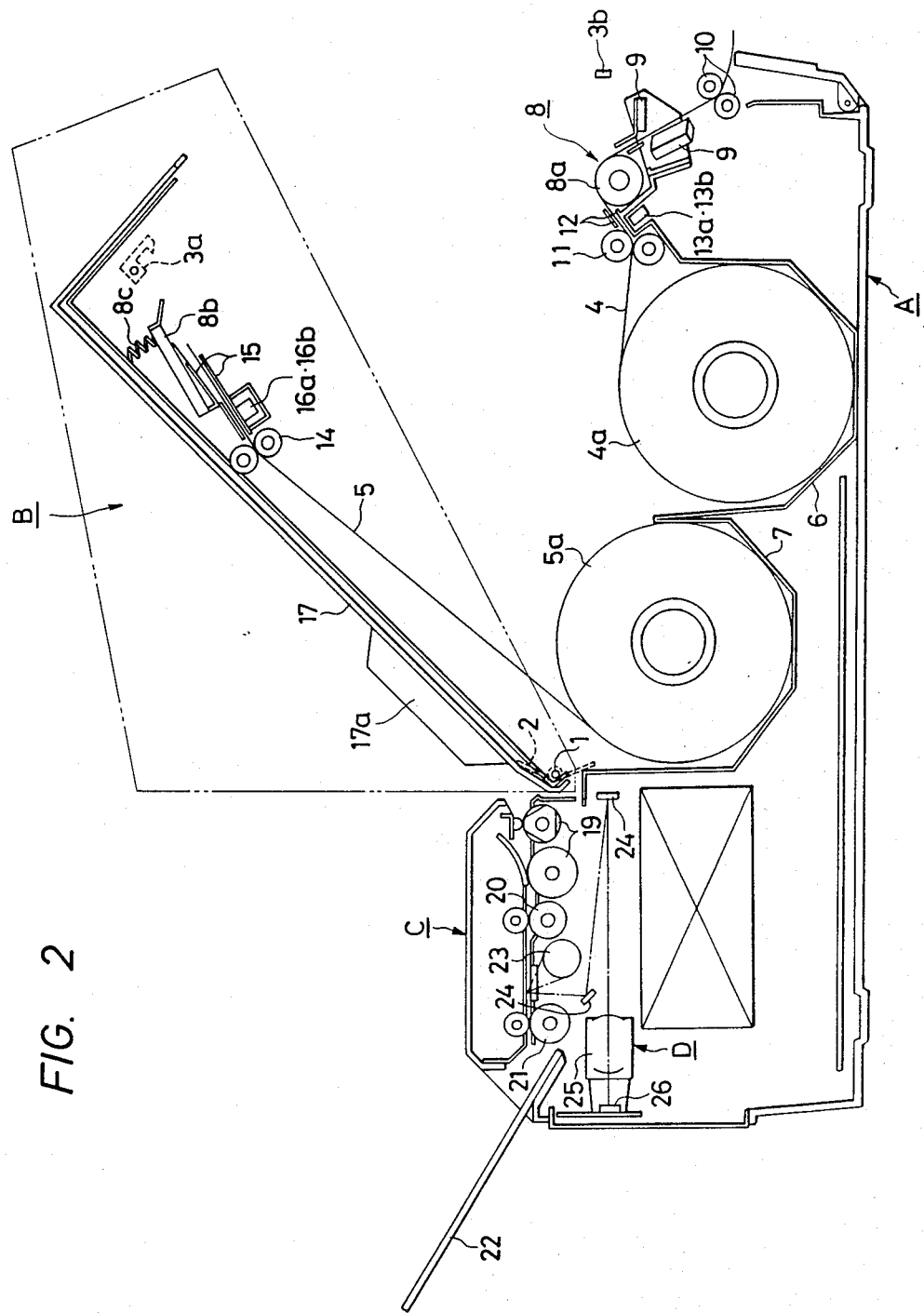
Figure 3:
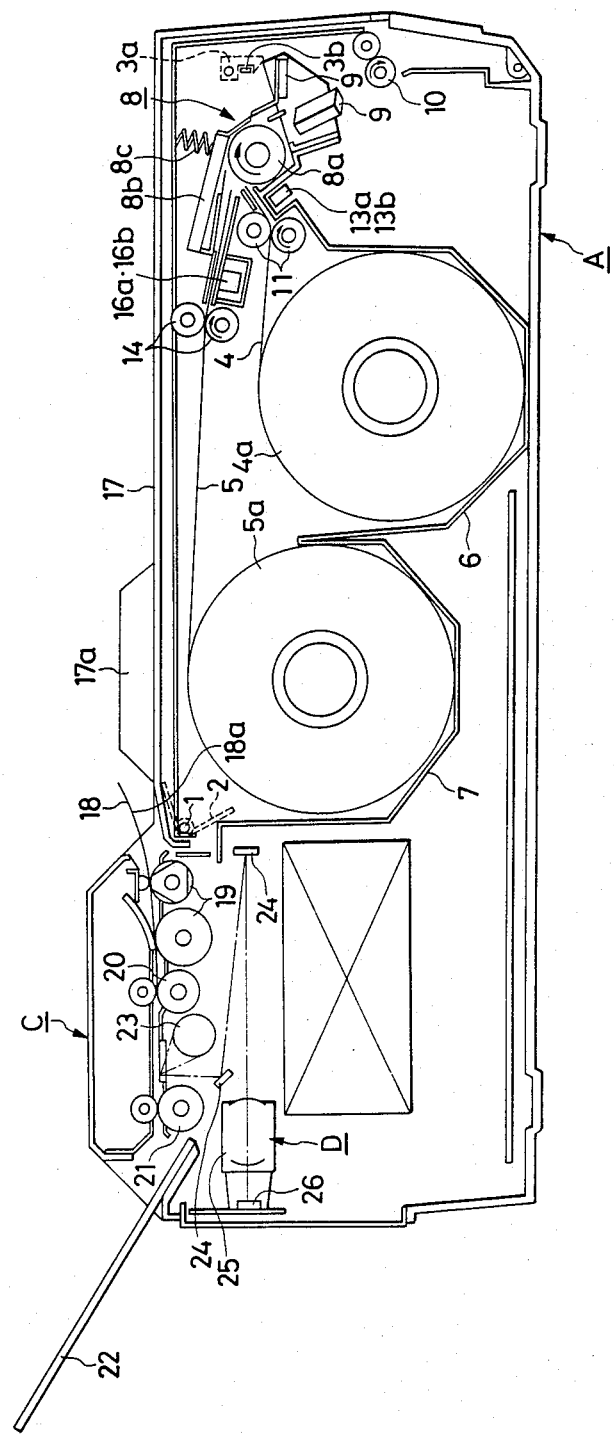
FIG. 3 is a cross-sectional view illustrating state in which the second housing is closed.

FIG. 1 is a perspective view showing a state in which a first housing A and a second housing B are opened, FIG. 2 is a view illustrating the cross-section thereof, and FIG. 3 is a cross-sectional view showing a state in which said two housings are closed.

In the figures, the first housing A which provides the apparatus body and the second housing B which provides the lid member thereof are supported by a shaft 1 and are openable and closable about the shaft 1. A spring 2 is provided on the shaft 1 which provides the center of pivotal movement, and hooks 3a and 3b adapted to restrain each other are provided on the open ends of the housings A and B so that the second housing B may be opened from the first housing A by the bias of the spring 2 when the restraint of the hooks 3a and 3b is released.

Two drop-in type roll holders 6 and 7 into which sheet rolls 4a and 5a of different sizes comprising recording sheets 4 and 5 each wound in the form of a roll can be individually loaded are juxtaposed in the first housing A. One of the recording sheets 4 and 5 contained in the roll holders 6 and 7 is conveyed to a recording station 8 by a selection signal from a control unit (not shown). In the recording station 8, a predetermined image may be recorded on the recording sheet by a recording head 8b heated in response to image information, and the recording sheet after the recording may be cut at the trailing end of the image by cutters 9 provided in the first housing A and may be discharged out of the apparatus by a pair of discharge rollers 10 also provided in the first housing A.

The recording station 8 is comprised of a platen roller 8a for conveying the recording sheets 4 and 5 at a constant speed, and a line type recording head 8b adapted to be urged against the roller 8a as shown in FIG. 3 and heating the recording sheets each comprising a thermosensitive sheet in response to image information. The platen roller 8a is disposed in the first housing A and the recording head 8b is disposed in the second housing B, and the two are designed to be urged against each other by a pressing spring 8c mounted on the back of the recording head when the two housings A and B are closed. Alternatively, the platen roller 8a may be disposed in the second housing B and the recording head 8b may be disposed in the first housing A.

The recording sheets 4 and 5 are conveyed to the recording station 8 by a pair of feed rollers which are feed members. A pair of feed rollers 11 for conveying the recording sheet 4 contained in the roll holder 6 nearer to the recording station 8 (hereinafter referred to as the "first holder") is provided between the first holder 6 and the platen roller 8a in the first housing A. Also, a sheet presence detecting sensor 13a and a sheet width detecting sensor 13b are provided between the pair of feed rollers 11 and the platen roller 8a with a sheet guide 12 interposed therebetween. A pair of feed rollers 14 for conveying the recording sheet 5 contained in the roll holder 7 more distant from the recording station 8 (hereinafter referred to as the "second holder") is provided on the second housing B side and between the recording head 8b and the second holder 7. A sheet presence detecting sensor 16a and a sheet width detecting sensor 16b are also provided between the pair of feed rollers 14 and the recording head 8b with a sheet guide 15 interposed therebetween.

A driving system to be described for rotatively driving the platen roller 8a and the pairs of feed rollers 11 and 14 and a control unit are provided in the first housing A.

In the figures, letter C designates an original conveying system, and originals 18 placed on an original supporting table 17 formed on the upper surface of the second housing B and having their both sides guided by an original side guide 17a may be separated one by one by a separating roller 19 and conveyed to the left at a constant speed by a conveyor roller 20 as viewed in the figures and discharged onto a discharge tray 22 by a discharge roller 21. While the original 18 is conveyed, the image-bearing surface 18a of the original 18 is irradiated by the light source 23 of an original reading system D, and the reflected light therefrom passes to an image reading element 26 such as a CCD via a plurality of mirrors 24 and a lens 25, and the image of the original 18 is read. The image signal may be transmitted to a predetermined recording system. For example, where the transmitting function of the facsimile is used, said image signal is transmitted to the recording system of other facsimile apparatus. Also, where the copying function of the facsimile is used, said image signal is transmitted to the recording system in the same apparatus.

Operation of the apparatus constructed as described above will now be described.

First, when setting the sheet rolls, the restraint of the hook 3 is released to thereby open the second housing B, and for example, the sheet roll 4a of size A4 is loaded into the first holder 6. The leading end of that sheet is then passed between the pair of feed rollers 11 and to the vicinity of the fore end of the sheet guide 12. Likewise, the sheet roll 5a of size B4, for example, is loaded into the second holder 7, and the leading end of that sheet is passed between the pair of feed rollers 14 and to the vicinity of the fore end of the sheet guide 15.

After the sheet rolls have been set as described above, the second housing B is closed and a manual cutting operation is performed.

This operation is accomplished by first rotating the feed rollers 11 and the platen roller 8a in the direction of arrow indicated in FIG. 3 to thereby convey the recording sheet 4 to the cutters 9 and the pair of discharge rollers 10, and cutting the leading end of the recording sheet by the cutters 9. Further, the recording sheet 4 thus cut is discharged out of the apparatus and at the same time, the platen roller 8a and the feed rollers 11 are rotated in the opposite direction, and the leading end of the recording sheet 4 is rewound to the vicinity of the fore end of the sheet guide 12 to thereby bring about the standby. Subsequently, with respect to the recording sheet 5, the feed rollers 14, the platen roller 8a and the cutter 9 are operated in the same manner as previously described, whereby the leading end of the recording sheet 5 is cut and at the same time, the leading end of the recording sheet after cut is rewound to the vicinity of the fore end of the sheet guide 15 to thereby bring about the standby.

The leading ends of the recording sheets 4 and are made fine by the above-described manual cutting operation and the leading ends of the recording sheets are brought to their accurate standby positions by controlling the amounts of rotation of the platen roller 8a and the feed rollers 11 and 14.

Next, during recording, assuming that the image information of size A4 has been received, it is detected by the sheet width detecting sensor 13b that the width of the recording sheet 4 is size A4 and at the same time, the feed rollers 11 are rotated in the direction of arrow indicated in FIG. 3 to thereby convey the recording sheet 4 to the recording station 8. When the leading end of this recording sheet 4 is conveyed to the portion of pressure contact between the platen roller 8a and the recording head 8b, the drive of the feed rollers 11 is stopped while, at the same time, the platen roller 8a is rotated in the direction of arrow indicated in FIG. 3 to convey the recording sheet 4 at a constant speed. In synchronism with this conveyance, the recording head 8b is heated in response to the image information and the received image information is recorded on the recording sheet 4 by this heating. At this time, the feed rollers 11 are rotated with the conveyance of the recording sheet 4.

When the recording of the received image information is terminated in the manner described above, the recording sheet 4 is conveyed until the trailing end position of the image comes to the cutters 9, and then it is cut and the recording sheet thus recorded is discharged out of the apparatus by the pair of discharge rollers 10 and at the same time, the platen roller 8a and the feed rollers 11 are rotated in the direction opposite to the direction of arrow indicated in FIG. 3, thereby rewinding the leading end of the recording sheet 4 to said standby position.

Recording of the received image of size A4 is terminated in the manner described above. Where the received image is of size B4, it is detected by the sheet width detecting sensor 16b that the recording sheet 5 is of size B4, and with respect to the recording sheet 5, the feed roller 14, the recording station 8 and the cutter 9 are operated in the same manner as previously described and recording of size B4 is effected on the recording sheet 5.

Next, in the jam processing or the like, the restraint of the hook 3 is released to open the second housing B. At this time, the recording sheet 4 and the recording sheet 5 divide onto the first housing A side and the second housing B side, respectively, as shown in FIG. 2 because the pairs of feed rollers 11 and 14 are separately provided in the first housing A and the second housing B. Accordingly, the jam processing or the like for one recording sheet does not interfere with the other recording sheet, and interchange of the sheet rolls 4a and 5a can be accomplished individually. Further, when the second housing B is opened, the sheet rolls 4a and 5a can be seen at a time and therefore, the remaining amounts of the rolls can be confirmed easily.

Figure 4:
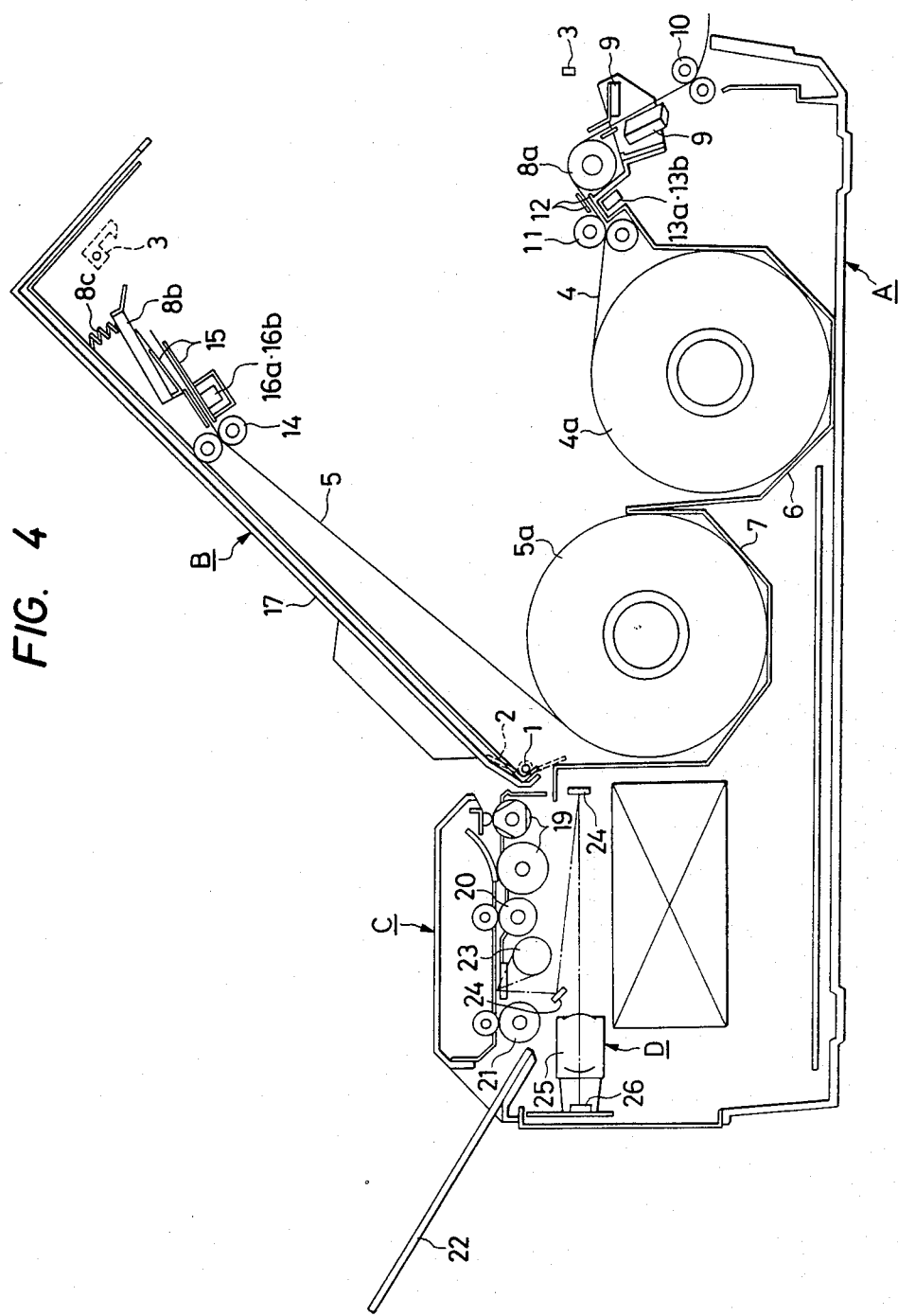
FIG. 4 illustrates a case where recording sheets are set.

Also, when setting the sheet rolls, the setting can be accomplished easily and reliably by passing, for example, the leading end of the recording sheet 4 to be set between the pair of feed rollers 11 and further passing said leading end along the platen roller 8a and through the gap of the cutters 9 are between the pair of discharge rollers 10 to thereby direct said leading end outwardly of the apparatus, as shown in FIG. 4, because the platen roller 8a and the recording head 8b of the recording station 8 are separately provided in the first housing A and the second housing B and the cutters 9 are provided on the first housing A side. So, oblique setting of the recording sheet 4 during the setting can also be prevented easily. This also holds true in a case where the platen roller 8a and the recording head 8b of the recording station 8 are provided in the second housing B and the first housing A, respectively.

Further, the driving system for the pairs of feed rollers 11 and 14 and the platen roller 8a is provided in the first housing A, whereby effective utilization of the space can be achieved and the weight of the second housing B can be made lighter, and this leads to compactness of the entire apparatus.

Figure 5:
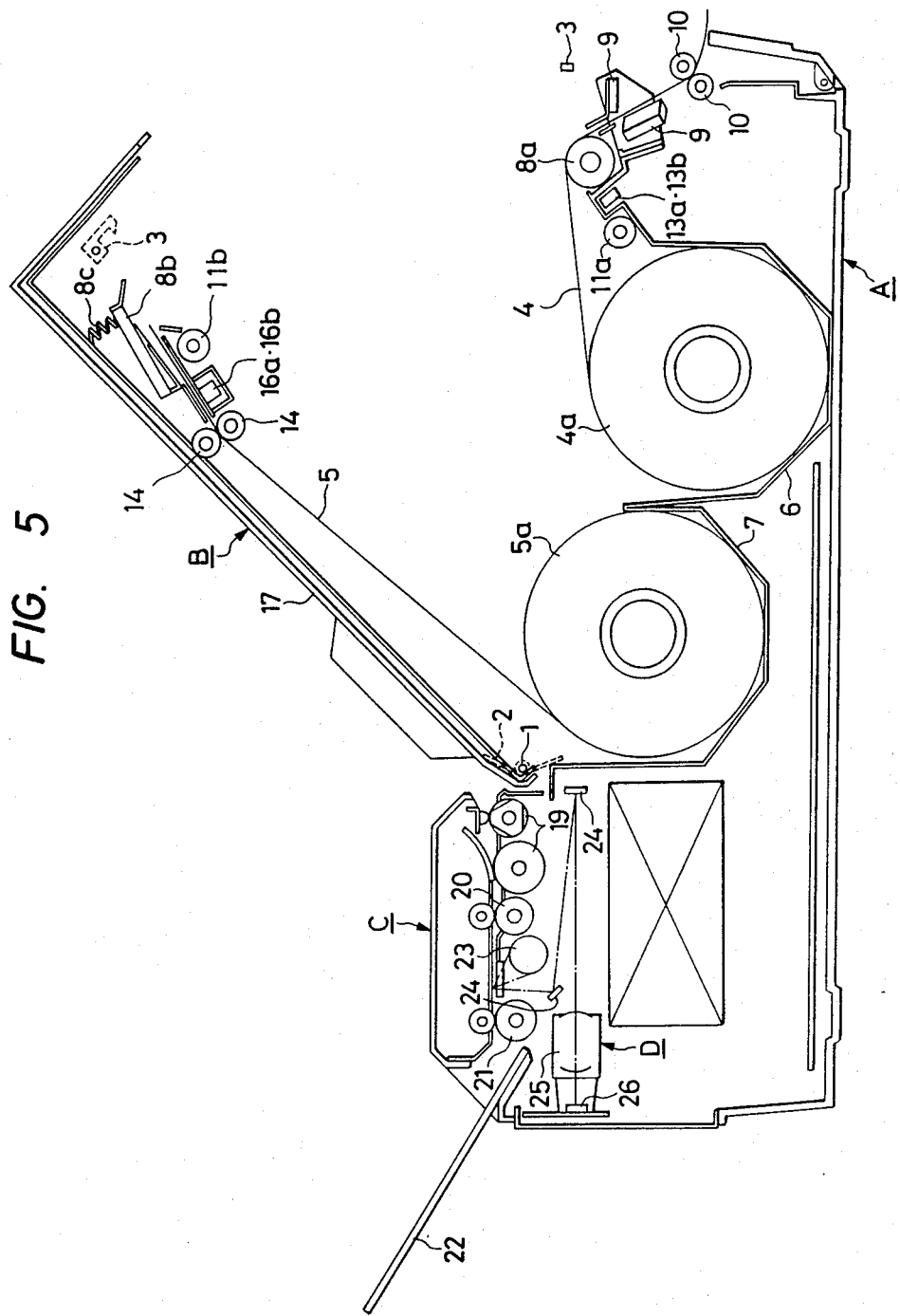
FIG. 5 illustrates an embodiment in which one of a pair of feed rollers provided in a first housing is provided on the second housing side.

When the recording sheet 4 is to be set or jam-processed, if as shown in FIG. 5, the drive roller 11a of the pair of feed rollers for conveying the recording sheet 4 is provided on the first housing A side and the pressure roller 11b urged against the drive roller 11a is provided on the second housing B side, the recording sheet 4 will become free when the second housing B is opened and therefore, setting or jam processing will become easier to do. In such case, it will be effective if a recording sheet of a size which is high in frequency of use is set in the first holder 6.

Also, in the previously described embodiment, if sheet rollers of the same size are contained in the holders 6 and 7, one of the recording sheets, for example, the recording sheet 4 is used during recording. When the recording sheet 4 becomes exhausted, the sheet presence detecting sensor 13a detects it and the other recording sheet 5 can also be used by the control unit. In this case, the recording sheet 5 has the function as a spare.

Although in the previously described embodiment, the sheet holders are horizontally juxtaposed in the first housing A, they may also be vertically juxtaposed.

Further, in the previously described embodiment, the platen and feed members have been shown in the form of rollers, but alternatively, they may be rotary belts passed over pulleys or the like.

In the present embodiment, as described above, the first housing and the second housing are made openable and closable and two sheet rolls can be contained in the first housing, and the feed members for conveying the respective sheets, the platen and the recording head are separately provided in the two housings and therefore, recording can be effected with a recording sheet matching the size of the received image being selected and setting or jam processing of the recording sheet can be accomplished easily. Further, the two sheet rolls can be seen when the housings are opened and therefore, the remaining amounts of the rolls can be confirmed at a time. Furthermore, if a sheet roll is used as a spare, the impossibility of reception which may result from the exhaustion of the recording sheet can be prevented.

Figure 6:
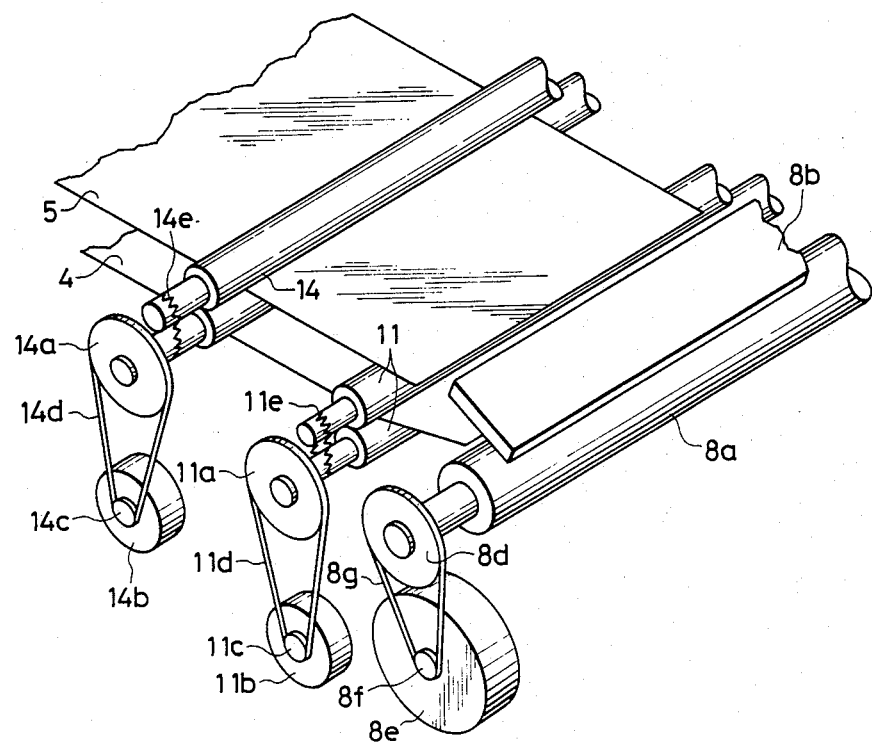
FIG. 6 illustrates a drive system.
Figure 7:
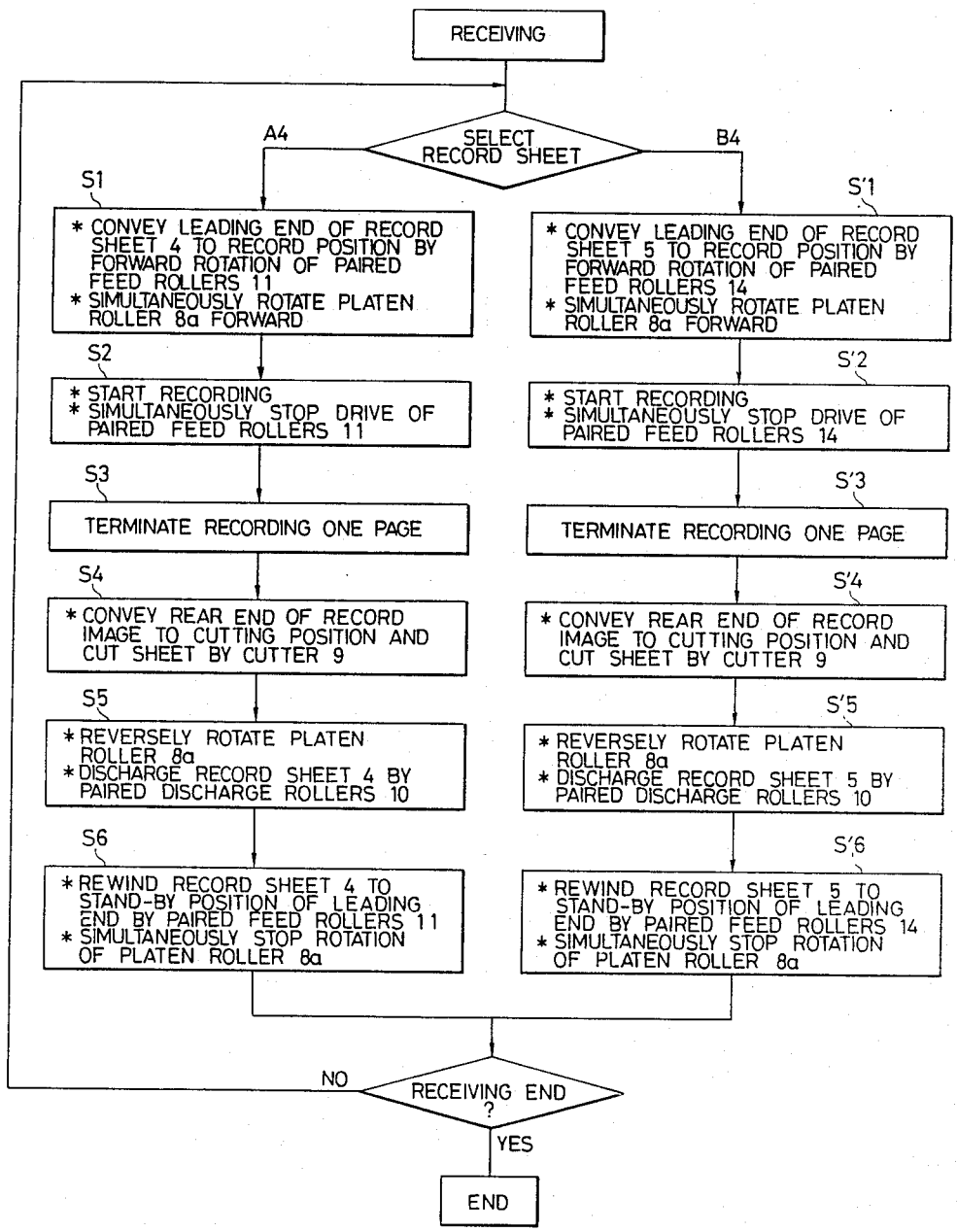
FIG. 7 is a flow chart of received image recording.
Figure 8:
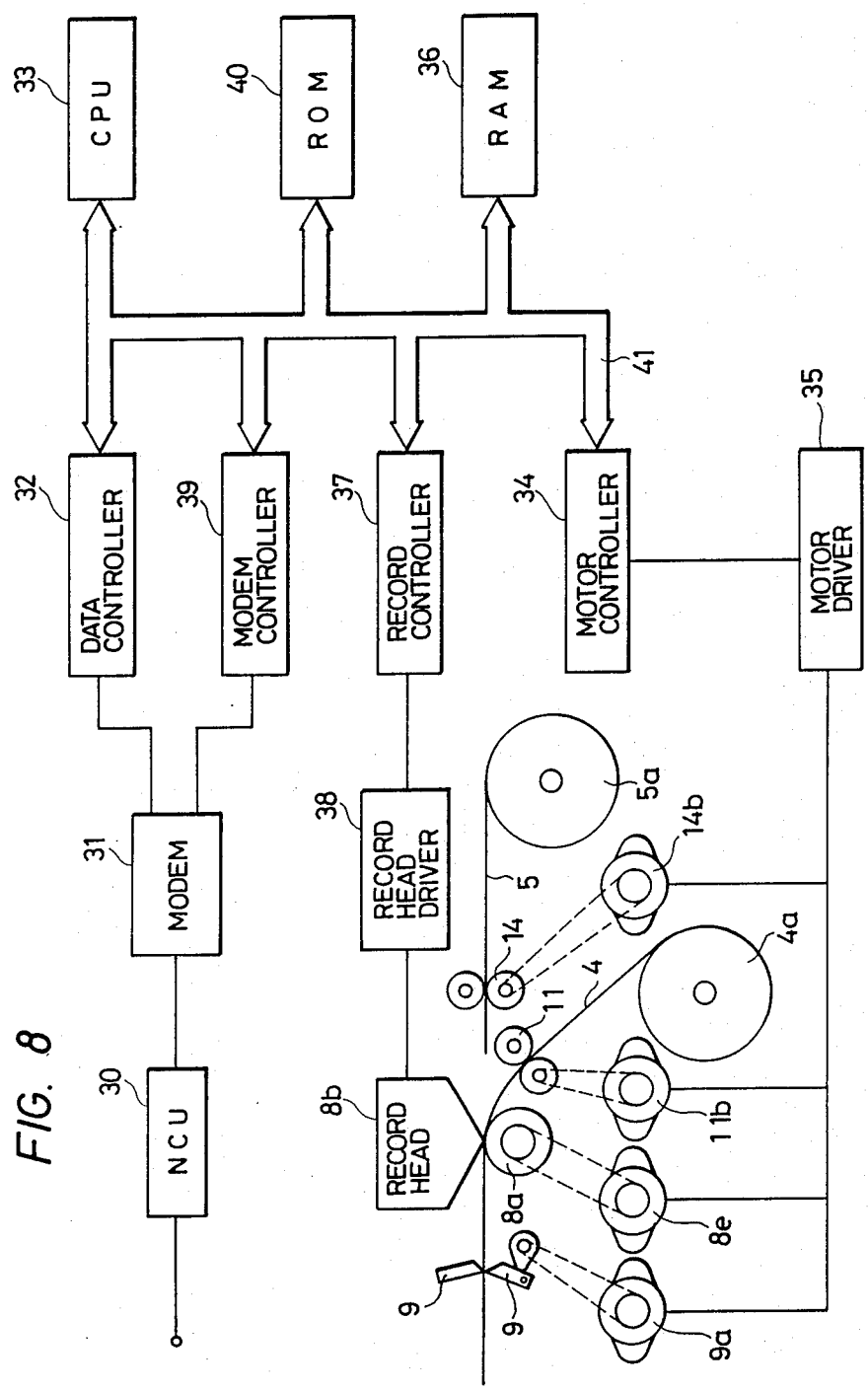
FIG. 8 is a block diagram of a control unit.

Reference is now had to FIGS. 6 to 8 to describe the drive transmitting system of the aforedescribed facsimile apparatus. Of course, the present invention is not restricted to the embodiment which will hereinafter be described.

As shown in FIG. 6, the platen roller 8a and the pairs of feed rollers 11 and 14 are designed such that drive forces are independently transmitted by individual drive motors 8e, 11b and 14b. That is, as shown in FIG. 6, pulleys 8d, 11a and 14a are mounted on the shaft of the platen roller 8a, the shaft of one of the pair of feed rollers 11 and the shaft of one of the pair of feed rollers 14, respectively, and belts 8g, 11d and 14d are passed over these respective pulleys 8d, 11a and 14a and the pulleys 8f, 11c and 14c of the drive motors 8e, 11b and 14b, respectively, whereby drive forces can be individually transmitted. Also, a control unit having a construction as shown in FIG. 8 for controlling the drives of the drive motors 8e, 11b and 14b is provided in the first housing A. Further, the pairs of feed rollers 11 and 14 are designed such that the respective rollers are urged by springs 11e and 14e and one roller of each pair follows the rotation of the other roll.

Also, when the recording sheet is to be conveyed during recording, the peripheral speed of the pair of feed rollers 11 (or 14) is controlled by the control unit so as to be somewhat higher than the peripheral speed of the platen roller 8a and the rotation of the pair of feed rollers 11 (or 14) is stopped by the control unit at a point of time whereat the leading end of the sheet conveyed by the pair of feed rollers 11 (or 14) has come to the recording station 8.

Recording will now be described with reference to the flow chart of FIG. 7 and the block diagram of FIG. 8. As shown, the image information transmitted from the transmitting side is demodulated by MODEM (demodulating unit) 31 through NCU 30 (circuit control) and supplied as a digital signal to a data controller 32. One of the recording sheets is selected by the data. For example, image information of size A4 has been received, it is detected by the sheet width detecting sensor 13b that the width of the recording sheet 4 is size A4 and at the same time, the motor 11b is driven by a signal from CPU (central processing unit) 33. Thereby the pair of feed rollers 11 are rotated in the direction of arrow indicated in FIG. 3 (forward rotation) to convey the recording sheet 4 to the recording station 8.

Simultaneously therewith, the platen roller 8a is rotated in the direction of arrow indicated in FIG. 3 by the drive motor 8e and at this time, the peripheral speed of the pair of feed rollers 11 is made higher than the peripheral speed of the platen roller 8a, whereby the leading end of the recording sheet 4 is forcibly fed into the portion of pressure contact between the rotating platen roller 8a and the recording head 8b (step S1).

When the leading end of the recording sheet 4 is conveyed to the recording station 8 as previously mentioned, the drive motor 11b becomes deenergized and the recording sheet 4 is conveyed at a constant speed by the platen roller 8a and at the same time, the received image information is recorded on the recording sheet 4 by the recording head 8b heated in response to the image information. At this time, the pair of feed rollers 11 is rotated with the conveyance of the recording sheet 4 (step S2).

The control of the rotation of the pair of feed rollers 11 and the platen roller 8a is accomplished by the signal from CPU 33 being transmitted through a motor controller 34 and a motor driver 35 to the motors 11b and 8e for rotating the respective rollers.

Also, the data controller 32 puts out data to the data bus, and RAM (random access memory) 36 introduces this data thereinto. Also, the data in the RAM 36 is introduced into the CPU 33 and compounded therein, and the thus compounded data is again supplied to and stored in the RAM 36. Further, when one line is stored in the RAM 36, the data is supplied to a record controller 37, from which the data is further supplied to a recording head driver 38, whereby the recording head 8b effects recording of one line.

When the recording of one line is completed, the motor 8e is driven by the signal from the CPU 33 to effect recording of the next line and the platen roller 8a is rotated thereby to convey the recording sheet 4 by an amount corresponding to one line. By this being repeated, recording of one page is completed (step S3).

When the recording of the received image information is completed in the manner described above, the recording sheet 4 is conveyed by the platen roller 8a until the trailing end position of the image comes to the cutters 9, whereupon the motor 9a is driven to operate the cutters 9 to cut the recording sheet 4 (step S4), and the recording sheet thus recorded is discharged out of the apparatus by the pair of discharge rollers 10 and at the same time, the platen roller 8a and the pair of feed rollers 11 are rotated in the direction opposite to the direction of arrow indicated in FIG. 3 (reverse rotation) (step S5), whereby the leading end of the recording sheet 4 is rewound to the standby position, thus completing the recording of the received image of size A4 (step S6).

Whether during the above-described recording, the leading end of the recording sheet 4 has been conveyed to the recording station 8, whether the trailing end of the image has been conveyed to the cutters, and whether the leading end of the recording sheet 4 has been rewound to the standby position are detected by counting the number of rotation steps of the motor 11b for rotating the pair of feed rollers 11 and of the motor 8e for rotating the platen roller 8a, and a signal for operating said motors is produced from the CPU 33 when the recording sheet 4 has been conveyed to said predetermined position.

In the above-described process, a current may be supplied to the drive motor 11b for rotating the pair of feed rollers 11 only when the recording sheet 4 is conveyed to the recording station 8 and when the recording sheet 4 is rewound to the standby position, whereby driving said motor and therefore, the consumed power can be saved and a trouble such as overheating of the drive motor 11b can be prevented from occurring. Also, as in the case where the platen roller and the pair of feed rollers are driven by a single drive motor, the operation of changing the direction of transmission of the drive by the use of a solenoid or the like or the necessity of providing a complicated gear train is entirely eliminated and therefore, rotation error such as back-lash becomes very small and the amount of conveyance of the recording sheet 4 can be accurately controlled. Reference numeral 39 designates a MODEM controller which selects from G2MODEM and G3MODEM. Reference numeral 40 denotes ROM which stores therein the control timing or the like of the recording head 8b. Reference numeral 41 designates a bus line.

When the received image is of size B4, it is detected by the sheet width detecting sensor 16b that the recording sheet 5 is of size B4, and the feed rollers 14, the recording station 8 and the cutters 9 operate for the recording sheet 5 in the same manner as previously described, and as shown in steps S1–S6 in FIG. 7, recording of size B4 is effected on the recording sheet 5.

By the drive system for the pairs of feed rollers 11 and 14 and the platen roller 8a being thus provided in the first housing A, effective utilization of the space can be achieved and the weight of the second housing B can be made lighter, and this leads to compactness of the entire apparatus.

Although in the previously described embodiment, the peripheral speed of the pair of feed rollers 11 (or 14) is made somewhat higher than the peripheral speed of the platen roller 8a, the recording sheet 4 can be conveyed even if the peripheral speed of the pair of feed rollers 11 (or 14) is not so set as described above.

Also, in the previously described embodiment, the platen roller 8a and the pairs of feed rollers 11 and 14 are driven by the belts being passed over the respective pulleys and drive motors, but design may also be made such that the transmission of the drive forces from the respective motors to the pairs of feed rollers or the platen roller is accomplished by gears. If this is done, the opening of the second housing B can be accomplished easily.

Further, in the previously described embodiment, the sheet holders are horizontally juxtaposed in the first housing A, but alternatively, they may be vertically juxtaposed.

Still another embodiment of the present invention will hereinafter be described with reference to FIGS. 9 to 11. The structure of the apparatus hereinafter described is similar to that shown in FIGS. 1 to 3.

The embodiment hereinafter described is a facsimile apparatus in which a recording sheet is conveyed by a platen and an image corresponding to image information is recorded by a recording head and wherein a first housing and a second housing are made openable and closable and sheet holders capable of individually containing therein two recording sheets each wound in the form of a roll and a feed member for conveying the recording sheet contained in one of the sheet holders to a recording station are provided in the first housing and a feed member for conveying the recording sheet contained in the other sheet holder to the recording station is provided in the second housing and further, a control unit is provided for controlling the rotational speed of the platen before the leading end of the recording sheet comes to the recording station during recording so as to be lower than the maximum rotational speed of the platen during recording.

According to the above-described embodiment, recording sheet rolls of different sizes are contained in the respective sheet holders, whereby recording can be accomplished on the sheet matching the size of image information. Also, during recording, the rotational speed of the platen before the recording sheet comes to the recording station, that is, when the recording head is directly urged against the platen, is made slow, whereby a great rotational torque is produced without the use of a large motor.

Description will now be made of an embodiment applied to a facsimile apparatus.

According to this embodiment, assuming that image information of size A4 has been received during recording, it is detected by the sheet width detecting sensor 13b that the width of the recording sheet 4 is size A4 and at the same time, the feed rollers 11 and the platen roller 8a are rotated in the direction of arrow indicated in FIG. 3 (the direction indicated by arrow is the forward direction and the direction opposite to the direction of arrow is the reverse direction). At this time, the driving of the feed rollers 11 and the platen roller 8a is controlled by the control unit as shown in the timing chart of FIG. 9A.

That is, the recording sheet 4 is first conveyed to the recording station 8 by the feed rollers 11 rotated in the forward direction and, when the leading end of this sheet comes to the portion of pressure contact between the platen roller 8a and the recording head 8b, the feed rollers 11 are stopped from rotating. Thereafter, the recording sheet 4 is conveyed at a constant speed by the rotation of the platen roller 8a and the recording head 8b is heated in response to the image information, whereby the received image information is recorded on the recording sheet 4. The feed rollers 11 are rotated as the recording sheet 4 is conveyed by the platen roller 8a.

At this time, the rotational speed of the platen roller 8a is a speed $N_1$ lower than the normal rotational speed during the period T from the start of rotation until the leading end of the recording sheet 4 comes to the recording station 8, that is, when the platen roller 8a is rotated while being in direct pressure contact with the recording head 8b. At a point of time whereat the leading end of the recording sheet 4 has been conveyed to the recording station 8, i.e., a point of time whereat the recording sheet 4 has been conveyed to between the platen roller 8a and the recording head 8b, the number of rotations is increased to the normal rotational speed $N_2$ and at that speed, predetermined recording is effected on the recording sheet 4.

Thereafter, when the recording of the received image information is terminated, the recording sheet is conveyed at the aforementioned speed until the trailing end position of the image comes to the cutters 9, whereupon the recording sheet is stopped and cut from the trailing end of the image by the cutters 9. Further, the recording sheet thus recorded is discharged out of the apparatus by the pair of discharge rollers 8a and at the same time, the platen roller 8a and the feed rollers 11 are rotated in the reverse direction to rewind the leading end of the recording sheet 4 to said standby position.

During said rewinding also, the platen roller 8a is rotated at the normal rotational speed during the period $T_2$ during which the cut leading end of the recording sheet 4 is rewound from the position of the cutters 9 to the recording station 8, that is, when the recording sheet 4 intervenes between the platen roller 8a and the recording head 8b, and the platen roller is rotated at the speed N lower than the normal rotational speed during the time that the leading end of the recording sheet 4 is rewound from the recording station 8 to the standby position by the feed rollers 11, that is, when the platen roller 8a is being rotated while being in direct pressure contact with the recording head 8b.

As described above, during recording, the platen roller 8a is speed-controlled so as to be rotated at the low speed when it is rotated while being in direct pressure contact with the recording head 8b.

Figure 9B:
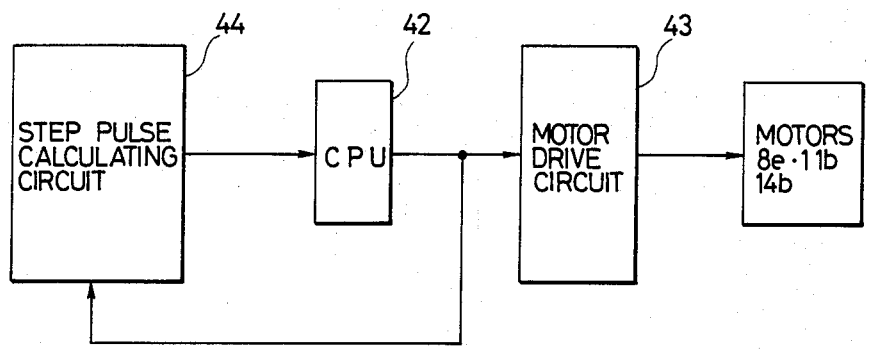
FIG. 9B illustrates a construction for controlling the speed of a motor.

The above-described speed control is accomplished by the control unit, and the construction of the control unit is such that as shown in FIG. 9B, a recording operation signal is transmitted from CPU 42 to a motor drive circuit 43 through which the motor drives. At this time, the number of rotation steps is calculated by a step pulse calculating circuit 44. Accordingly, when the motor is rotated in the forward direction, whether the leading end of the recording sheet 4 has been conveyed from the standby position to the recording station 8 and whether after completion of the recording, the trailing end of the recorded image has been conveyed from the recording station 8 to the position of the cutters 9 are detected by counting the number of rotation steps of the motor by the step pulse calculating circuit, and when the motor is rotated in the reverse direction, whether the leading end of the sheet has been rewound from the position of the cutters 9 to the recording station 8 and whether the leading end of the sheet has been rewound from the recording station 8 to the standby position are detected in the same manner as previously described, and in response to the signal from the step pulse calculating circuit 44, the CPU controls the rotational speed of the motor as shown in FIG. 9A.

Figure 10:
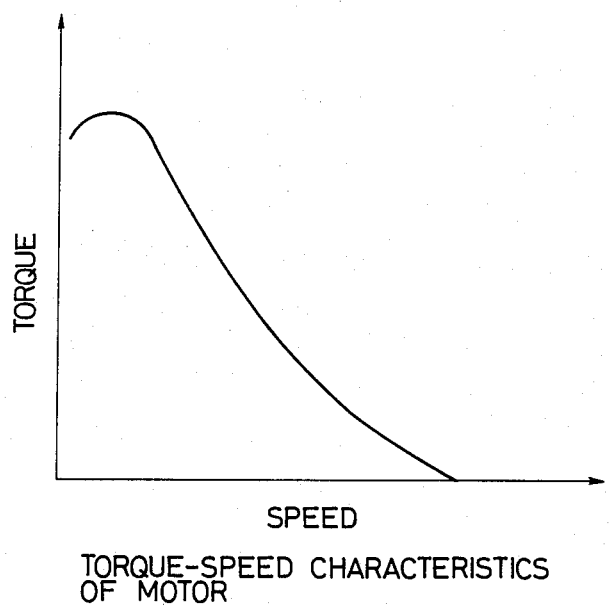
FIG. 10 illustrates the speed-torque characteristics of the motor.

Generally, the motor for rotatively driving the platen roller 8a has such a characteristic that it has a great torque when the rotational speed is low as shown in FIG. 10, but the torque decreases as the rotational speed becomes higher. Accordingly, when the platen roller 8a is rotated while being in direct pressure contact with the recording head 8b, that is, when friction is great as compared with the time when the recording sheet intervenes between the platen roller and the recording head and a great torque is required of the rotation of the platen roller 8a, the rotational speed of the platen roller 8a is set to a low value to thereby produce a great torque. Accordingly, the motor for rotating the platen roller 8a may be a motor which can rotate the maximum load during normal recording, and need not be a large motor which has taken said load increase into account.

Figure 11:
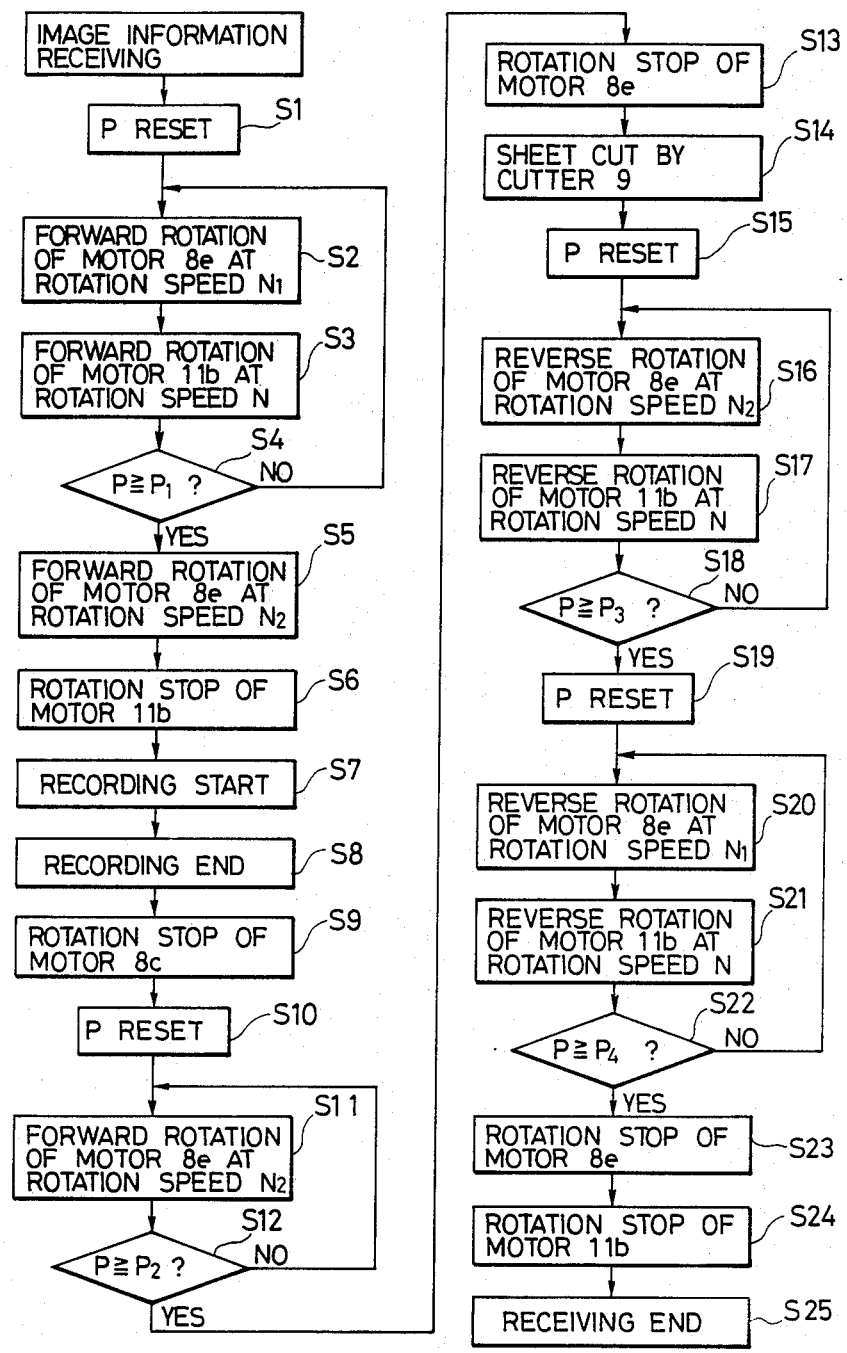
FIG. 11 is a flow chart.

FIG. 11 shows a flow chart of said control.

The operation till the start of said recording will first be described with reference to the flow chart shown in FIG. 11.

Before the motors 8e and 11b are rotated, the counter of the step pulse calculating circuit assumes 0, whereafter the counting of the numbers of rotation steps of the motors is started (step S1).

The motor 8e is rotated in the forward direction at the number of revolutions $N_1$ and the motor 11b is rotated in the forward direction at the number of revolutions N, and they continue to be rotated until the rotation pulse number thereof reaches a predetermined pulse number $P_1$, thereby conveying the recording sheet 4 to the recording station 8 (steps S2 and S3). P is the rotation pulse number of the motors 8e and 11b, and $P_1$ is the preset rotation pulse number of the motors 8e and 11b necessary for the leading end of the recording sheet 4 to be conveyed from the standby position to the recording station 8. At a point of time whereat $P=P_1$ (step S4), the number of revolutions of the motor 8e becomes $N_2$ (step S5) and the rotation of the motor 11b is stopped (step S6), and predetermined recording is effected in the recording station 8 (step S7).

The operation after the termination of said recording will now be described with reference to the flow chart shown in FIG. 11.

When the recording is terminated (step S8), the motor 8e is stopped from rotating (step S9). Then the counter of the step pulse calculating circuit once assumes 0 (step 10), and subsequently the counting of the motor rotation pulse number is started, and the motor 8e starts forward rotation at the rotational speed $N_2$ (step S11). At this time, the motor 11b remains stopped and the motor 8e continues to be rotated at the rotational speed $N_2$, and at a point of time whereat $P=P_2$ (step S12), the rotation of the motor 8e is stopped (step S13) and the recording sheet 4 is cut by the cutters 9 (step S14). $P_2$ is the preset step pulse number of the motors 8e and 11b necessary for the trailing end of the recorded image to be conveyed from the recording station 8 to the position of the cutters 9 after the termination of the recording.

Further, the counter of the step pulse calculating circuit assumes 0 (step S15), and the motors 8e and 11b are rotated in the reverse direction at the rotational speeds $N_2$ and N, respectively, to thereby rewind the recording sheet, and the rotation pulse number thereof is counted (steps S16 and S17). Further, at a point of time whereat $P=P_3$ (step S18), the counter of the step pulse calculating circuit assumes 0 (step S19), whereupon the rotational speed of the motor 8e in the reverse direction becomes $N_1$ (step S20). Also, the rotational speed of the motor 11b in the reverse direction becomes N (step S21). $P_3$ is the preset rotation pulse number of the motors 8e and 11b necessary for the leading end of the sheet after cut to the rewound from the position of the cutters 9 to the recording station.

Further, at a point of time whereat $P=P_4$ (step S22), the motors 8e and 11b are stopped from rotating (steps S23 and S24). $P_4$ is the preset rotation pulse number of the motors 8e and 11b necessary for the leading end of the sheet to be rewound from the recording station 8 to the standby position. Then, the reception is terminated (step S25).

The above case has been described as a case where image information of size A4 has been received, but where the received image is of size B4, it is detected by the sheet width detecting sensor 16b that the recording sheet 5 is of size B4 and with respect to the recording sheet 5, the feed rollers 14, the recording station 8 and the cutters 9 operate in the same manner as previously described, thereby effecting recording of size B4 on the recording sheet 5.

According to the above-described embodiment, when there is no recording sheet between the platen and the recording head, the rotational speed of the platen is slowed down to thereby eliminate the necessity of using a large motor which has taken the load increase into account and therefore, the motor for rotating the platen can be made compact, and this leads to the possibility of realizing the compactness and reduced cost of the entire apparatus.

Figure 12:
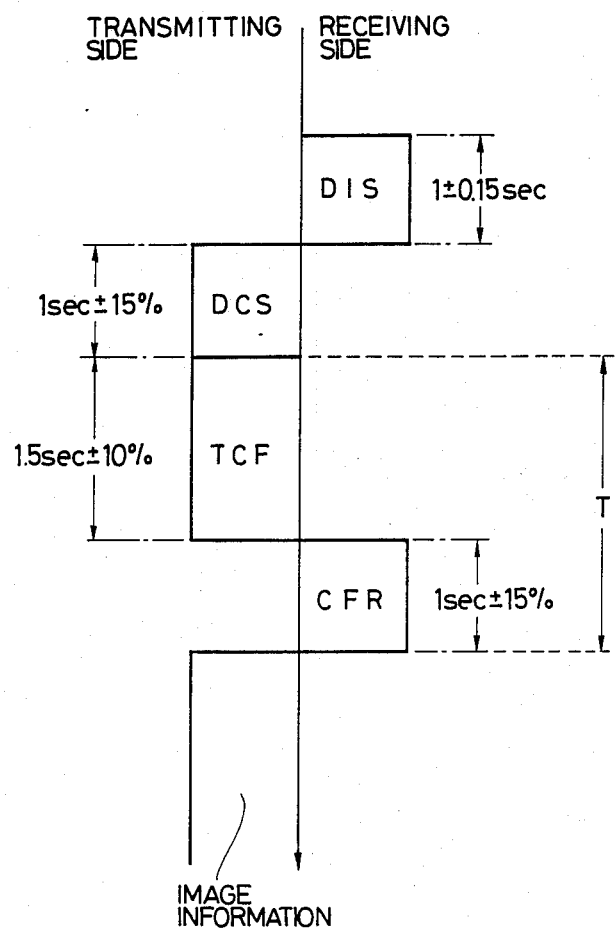
FIG. 12 illustrates the flow of image information receiving procedure in another embodiment of the present invention.

Still another embodiment of the present invention will now be described with reference to FIGS. 12 to 14.

The embodiment described below is applicable to the facsimile apparatus shown in FIGS. 1-3, and it is a recording method in which a recording sheet wound in the form of a roll is conveyed to a recording station and recording is effected on the recording sheet and wherein two rolls of recording sheets are contained in a first housing and when the received image information is to be recorded with one of the recording sheets conveyed to the recording station in response to a predetermined signal, one of the recording sheets is conveyed to the recording station by a feed member provided in the first housing and the other recording sheet is conveyed to the recording station by a feed member provided in a second housing openable and closable with respect to the first housing, and within the procedure time from after the width of the received image information has been detected until the image information comes to the recording station, the leading end of one of the recording sheets is conveyed to the recording station by the feed member.

According to this embodiment, two types of recording sheets are contained, whereby recording can be effected on a sheet matching the size of the received image and before the image information comes to the recording station during the reception of the image, the width size of the received image information is detected and the recording sheet matching said size is conveyed to the recording station and therefore, no wrong recording will occur.

Operation of the present embodiment will hereinafter be described.

In the facsimile apparatus according to the present embodiment, the drive system, not shown, for rotatively driving the platen roller 8a and the pairs of feed rollers 11 and 14 and the control unit shown in FIG. 9B are provided in the first housing A, and when the recording system receives image information and effects predetermined recording, the leading end of the recording sheet 4 (or the recording sheet 5) may be conveyed to between the platen roller 8a and the recording head 8b by the pair of feed rollers 11 (or the pair of feed rollers 14) within the reception procedure time. When setting sheet rolls, the restraint of the hook 3 is released to open the second housing B, and for example, a sheet roll 4a of size A4 is contained into the first holder 6 and the leading end of that sheet is passed between the pair of feed rollers 11 and brought to the vicinity of the fore end of the sheet guide 12. Likewise, for example, a sheet roll 5a of size B4 is contained into the second holder 7 and the leading end of that sheet is passed between the pair of feed rollers 14 and brought to the vicinity of the fore end of the sheet guide 15.

After the sheet rolls have been set as described above, the second housing B is closed and manual cutting operation is performed.

This operation is accomplished by rotating the feed rollers 11 and the platen roller 8a in the direction of arrow indicated in FIG. 3 to thereby convey the recording sheet 4 to the cutters 9 and the pair of discharge rollers 10, and cutting the leading end of the recording sheet by the cutters 9. The recording sheet 4 thus cut is discharged out of the apparatus and at the same time, the platen roller 8a and the feed rollers 11 are rotated in the opposite direction, whereby the leading end of the recording sheet 4 is rewound to a predetermined position downstream of the sheet presence detecting sensor 13a and the sheet width detecting sensor 13b and upstream of the recording station 8 and is thereby brought into the standby state. Subsequently, with respect to the recording sheet 5, the feed rollers 14, the platen roller 8a and the cutters 9 are operated in the same manner as previously described, whereby the leading end of the recording sheet 5 is cut, and then the leading end of the recording sheet after cut is rewound to a predetermined position downstream of the sheet presence detecting sensor 16a and the sheet width detecting sensor 16b and upstream of the recording station 8 and is thereby brought into the standby state.

The leading ends of the recording sheets 4 and 5 become fine by the above-described manual cutting operation, and the amounts of rotation of the platen roller 8a and the feed rollers 11 and 14 are controlled by the control unit shown in FIG. 9B, whereby the leading ends of the recording sheets are brought to the accurate standby positions.

Next, during recording, in a case where the image information transmitted from other facsimile apparatus is recorded, the leading end of the recording sheet 4 (or the recording sheet 5) is first conveyed to the recording station 8 within the image information reception procedure time.

The above operation will now be described specifically with reference to the flow which shows the binary procedure recommended in CCITT.T30 as shown, for example, in FIG. 12. First, it shows that the transmitting side transmits DIS (digital identification signal) for 1±0.15 sec. and that the receiving side has the receiving function of CCITT standard. Upon reception of said DIS (digital identification signal), the transmitting side transmits DCS (digital command signal) for 1 sec. ±15%, and exhibits a function set from the standard function represented by said DIS (digital identification signal).

Subsequently, upon reception of the DCS (digital command signal), the receiving side detects the width size of the received image information and selects the recording sheet 4 or 5 of said size. Further, the receiving side transmits TCF (training check) for 1.5 sec. ±10% in subsequence to the DCS (digital command signal), confirms the training of MODEM on the receiving side and checks whether the channel can be used at this transmission speed.

Further, when the MODEM training by the TCF (training check) is completed, the receiving side transmits CFR (reception preparation confirmation signal) for 1 sec. ±15%, and shows that the procedure before a message is delivered has been completed and delivery of the message may be started. When the transmitting side receives the CFR (reception preparation confirmation signal), it transmits image information as facsimile data. When the receiving side receives the facsimile data, the recording head 8b is heated in response to the image information and recording is started in the recording station 8.

That is, the time from after the receiving side has received the DCS (digital command signal) until it receives the facsimile data is the procedure time T, and according to the recommendation of said CCITT.T30, T = (1.5 sec. ±10%) + (1 sec. ±15%) = 2.2–2.8 sec.

Accordingly, in the above case, the leading end of the recording sheet is conveyed to the recording station 8 within the minimum value 2.2 sec. of the reception procedure time T.

That is, assuming that image information of size A4 has been received, it is detected by the sheet width detecting sensor 13b that the width of the recording sheet 4 is size A4 and at the same time, the feed rollers 11 are rotated in the direction of arrow indicated in FIG. 3 to thereby convey the leading end of the recording sheet 4 to the recording station 8 within said time.

Subsequently, when the leading end of the recording sheet 4 is conveyed to the portion of pressure contact between the platen roller 8a and the recording head 8b, the driving of the feed rollers 11 is stopped and at the same time, the platen roller 8a is rotated in the direction of arrow indicated in FIG. 3 to thereby convey the recording sheet 4 at a constant speed. In synchronism with this conveyance, the recording head 8b is heated in response to the image information, whereby the received image information is recorded on the recording sheet 4. At this time, the feed rollers 11 are rotated as the recording sheet 4 is conveyed.

When the recording of the received image information is terminated in the manner described above, the recording sheet 4 is conveyed to be cut until the trailing end of the image comes to the cutters 9, whereafter the recording sheet thus recorded is discharged out of the apparatus by the pair of discharge rollers 10 and at the same time, the platen roller 8a and the feed rollers 11 are rotated in the direction opposite to the direction of arrow indicated in FIG. 3, thereby rewinding the leading end of the recording sheet 4 to the standby position.

The recording of the received image of size A4 is completed in the manner described above.

The driving of the feed rollers and platen roller is controlled by a control unit which is similar in construction to that shown in FIG. 9B.

Figure 13:
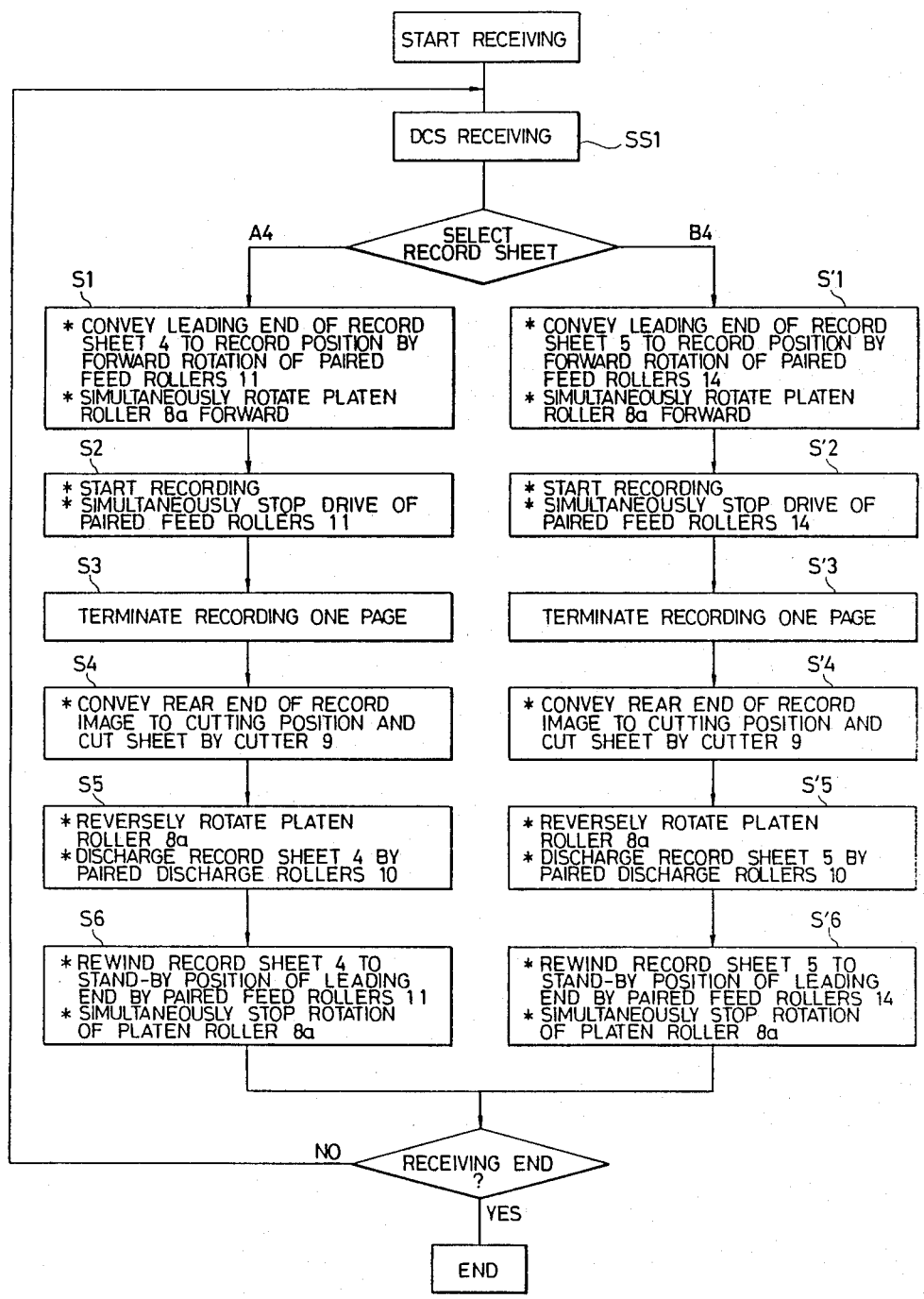
FIG. 13 is a flow chart thereof.
Figure 14:
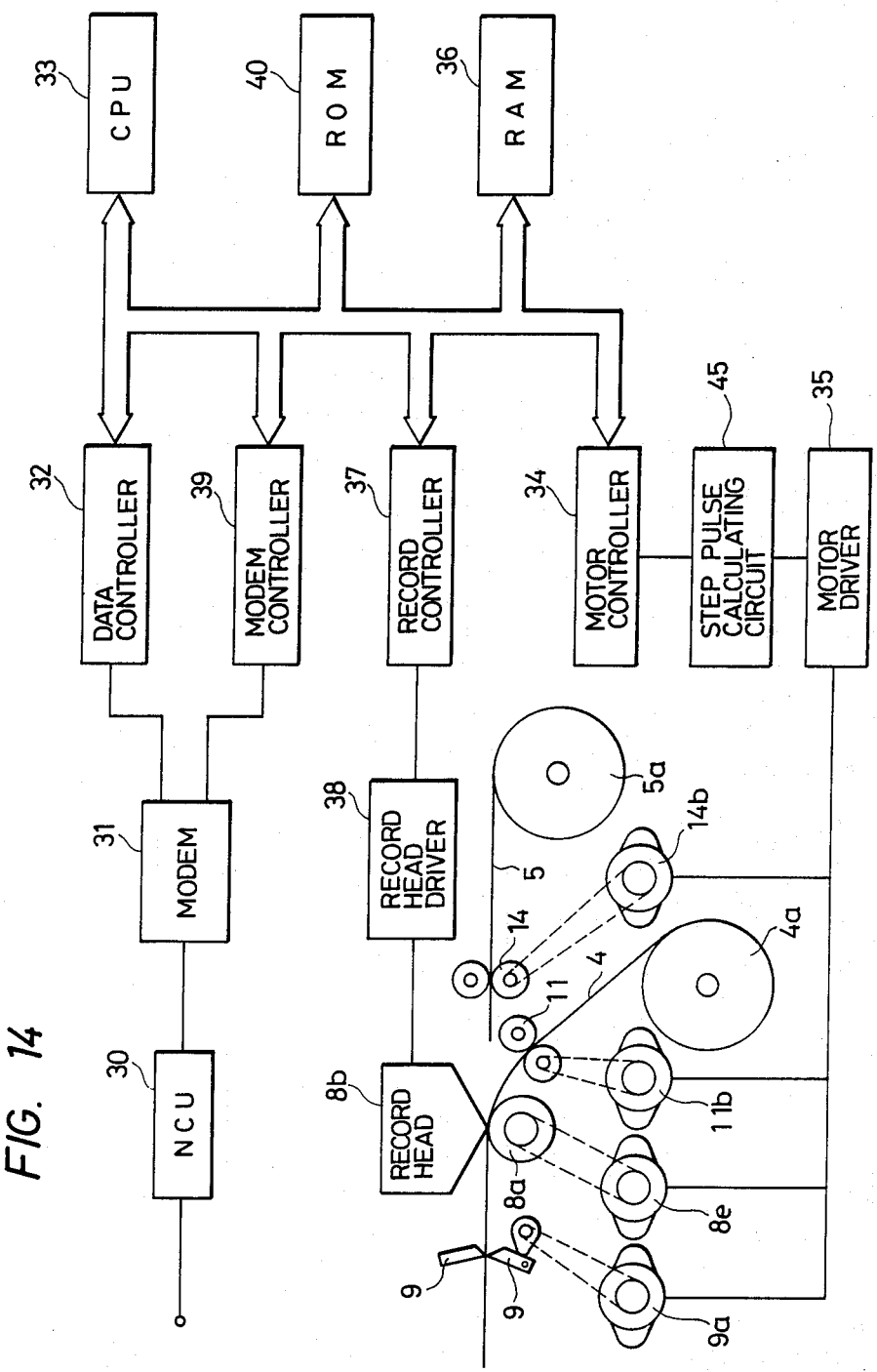
FIG. 14 is a block diagram thereof.

The flow chart and block diagram of the above-described embodiment are shown in FIGS. 13 and 14, respectively.

In the flow chart of FIG. 13 which shows the control procedure in the above-described embodiment, the procedure (step SS1) of receiving the aforementioned DCS (digital command signal) is added before the recording sheet selecting procedure in the control procedure shown in FIG. 7. Also, in the block diagram shown in FIG. 14, a step pulse calculating circuit 45 is added to the block diagram shown in FIG. 8.

Yet still another embodiment of the present invention will hereinafter be described with reference to FIGS. 15 to 17.

The embodiment hereinafter described is a recording apparatus in which two sheet rolls each comprising a wound recording sheet are contained in the apparatus having openable and closable first and second housings and said recording sheets are selectively conveyed to a recording station to thereby effect recording and wherein a pivotable intermediate member is provided between the first housing and the second housing and a conveyance path for one of the recording sheets is formed between the first housing and the intermediate member and a conveyance path for the other recording sheet is formed between the intermediate member and the second housing.

Thus, according to the present embodiment, the two set roll sheets have their independent conveyance paths. Accordingly, when one of the recording sheets is to be interchanged or jam processing is to be carried out, even if the conveyance path for that sheet is opened, the conveyance path for the other recording sheet is not affected. Therefore, the user may initially set only the interchanged or jam-processed recording sheet.

Now, description will be made of an embodiment applied to a double roll type facsimile apparatus.

Figure 15A:
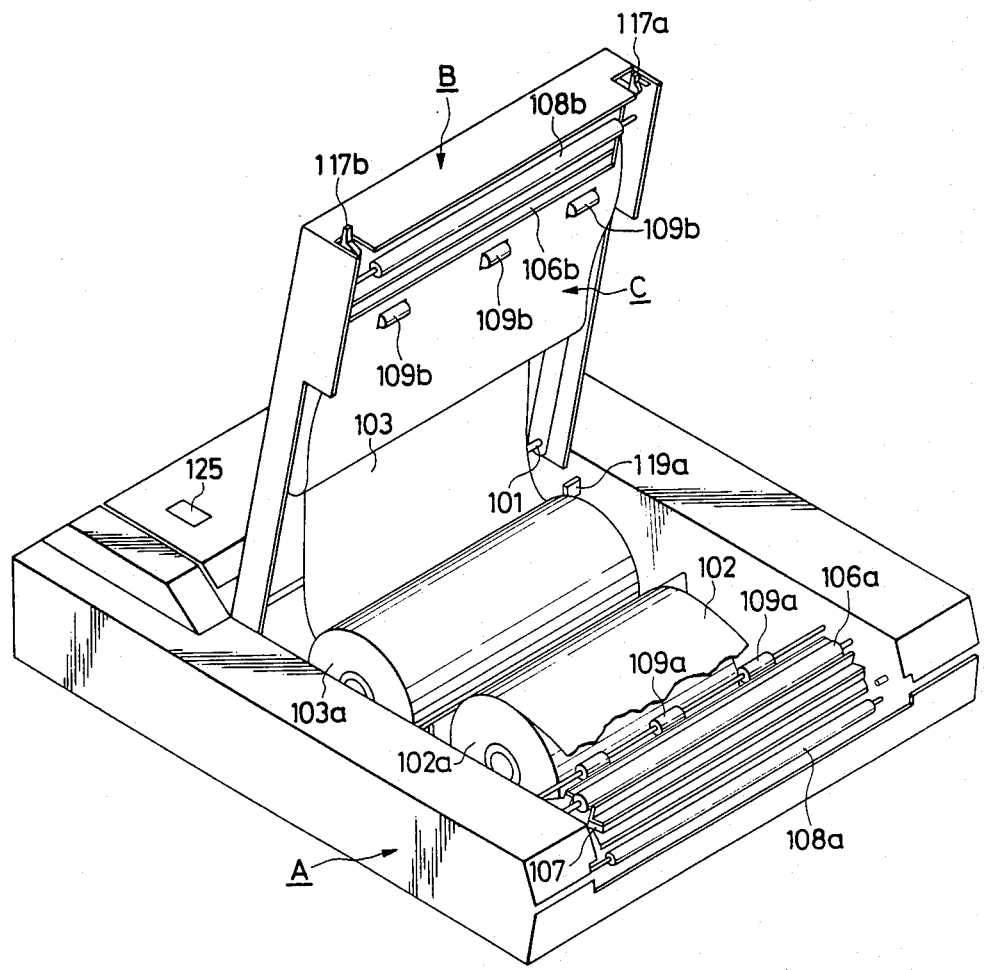
FIGS. 15A and 15B are a perspective view and a cross-sectional view, respectively, illustrating a state in which a second housing and an intermediate member are both opened.
Figure 15B:
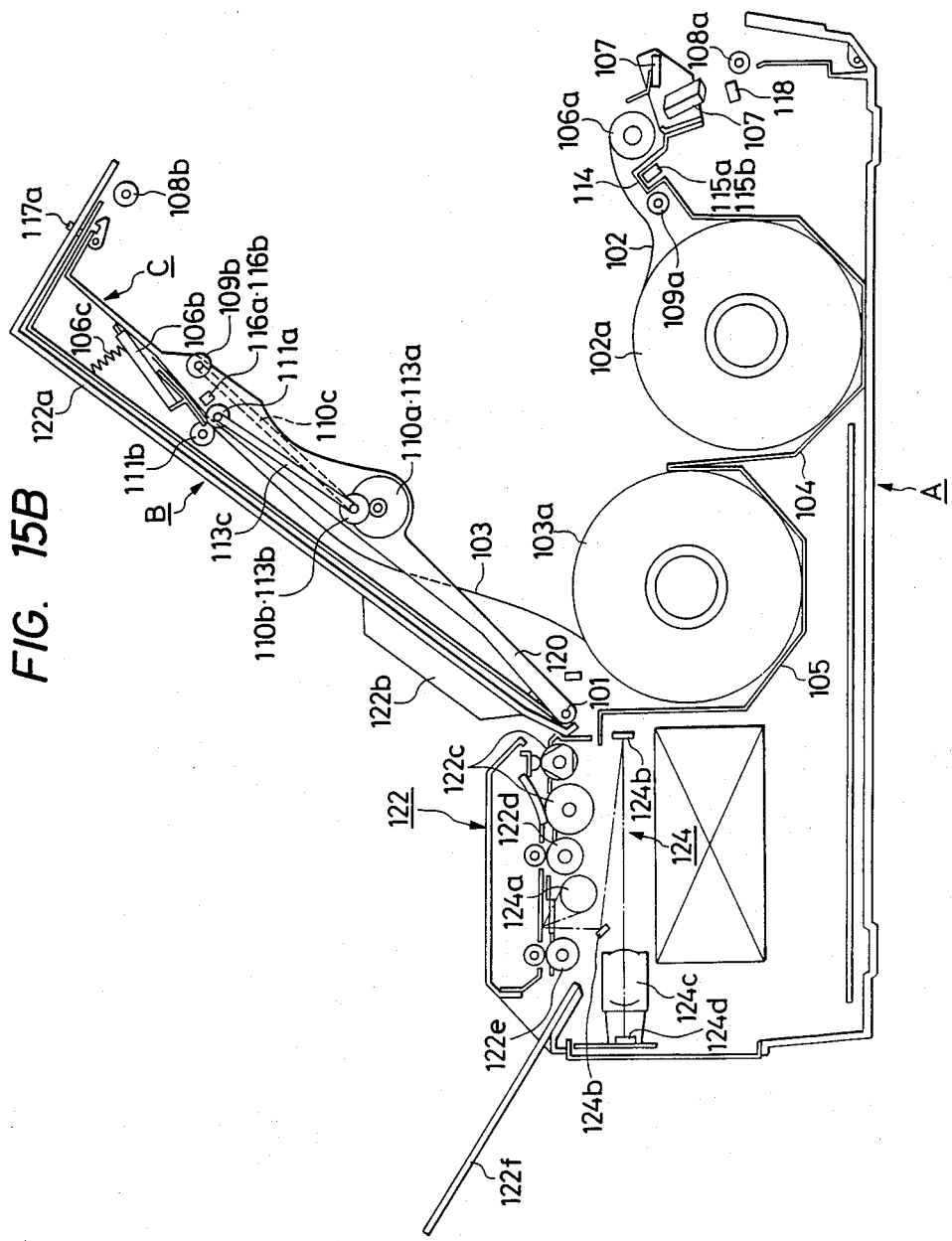
Figure 16:
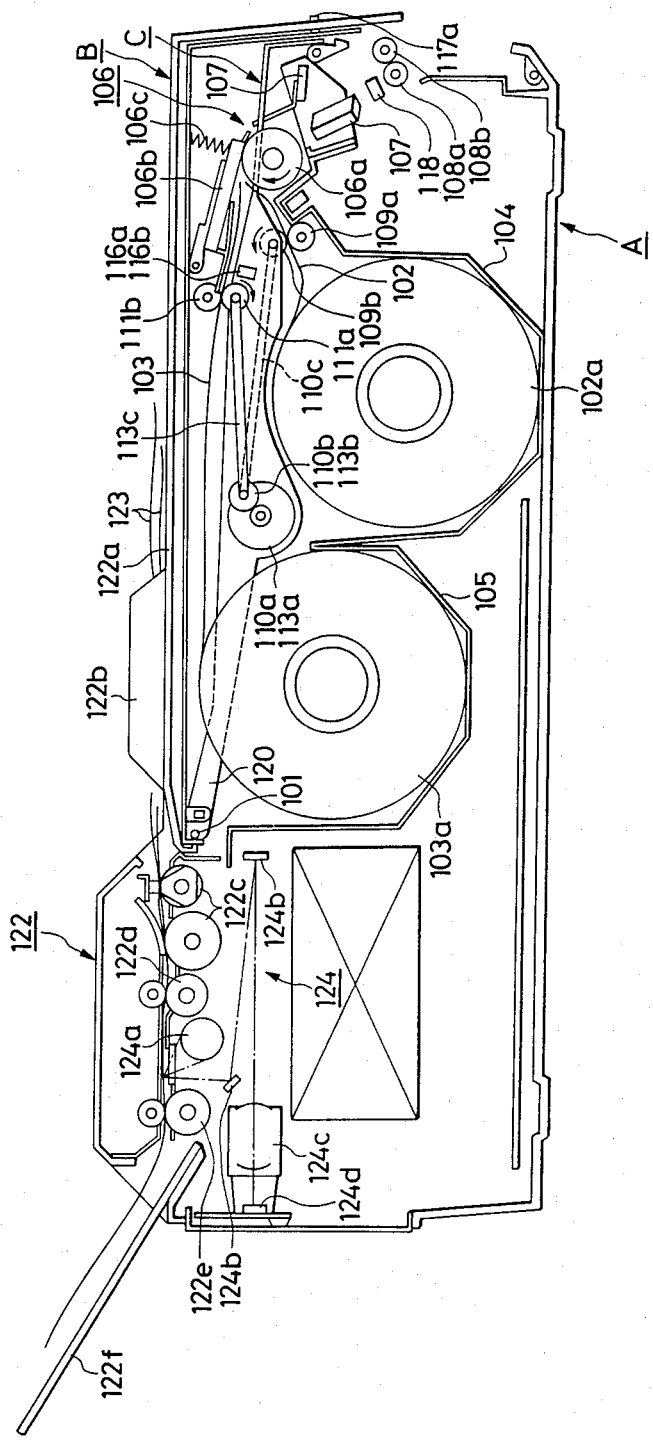
FIG. 16 is a cross-sectional view illustrating a state in which the second housing is closed.

FIGS. 15A and 15B are a perspective view and a cross-sectional view, respectively, illustrating a state in which the first housing A and the second housing B are opened, and FIG. 16 is a cross-sectional view illustrating a state in which said two housings are closed.

In the figures, the first housing A which provides the apparatus body and the second housing B which provides the lid member thereof are supported by a shaft 101 and are pivotable about the shaft 101. An intermediate member C is provided between the two housings A and B, and this intermediate member C is also pivotable about the shaft 101.

Two drop-in type roll holders 104 and 105 capable of containing therein sheet rolls 102a and 103a comprising recording sheets 102 and 103 of different sizes wound in the form of rolls are juxtaposed in the first housing A. One of the recording sheets 102 and 103 contained in the roll holders 104 and 105 may be conveyed to a recording station 106 by a selection signal from a control unit, and in the recording station 106, a predetermined image may be recorded on the recording sheet, whereafter the recording sheet may be cut from the trailing end of the image by cutters 107 provided in the first housing A and may be discharged out of the apparatus by a pair of discharge rollers 108a and 108b.

The recording station 106 is comprised of a platen roller 106a for conveying the recording sheets 102 and 103 at a constant speed, and a line type recording head 106b adapted to the urged against the platen roller 106a as shown in FIG. 16 and heat the recording sheet comprising a thermosensitive sheet in response to image information. The platen roller 106a is disposed in the first housing A, and the recording head 106b is disposed in the second housing B and is designed to be urged against the platen roller by a pressing spring 106c attached to the back of the recording head when the two housings A and B are closed.

The recording sheets 102 and 103 are conveyed to the recording station 106 by a pair of feed rollers urged against each other, and of a pair of feed rollers 109a and 109b for conveying the recording sheet 102 contained in the roll holder 104 nearer to the recording station 106 (hereinafter referred to as the "first holder), one feed roller 109a is rotatably provided L in the first housing A and the other feed roller 109b is rotatably provided in the intermediate member C. A rotational force is transmitted from a motor 110a provided in the intermediate member C to one feed roller 109b through a pulley 110b and a timing belt 110c, and the other feed roller 109a is designed to be urged against said roller 109b and follow the driving rotation thereof. Accordingly, a conveyance path for the recording sheet 102 is formed between the first housing A and the intermediate member C, and the recording sheet 102 may be conveyed to the recording station 106 by the pair of feed rollers 109a and 109b.

Figure 17A:
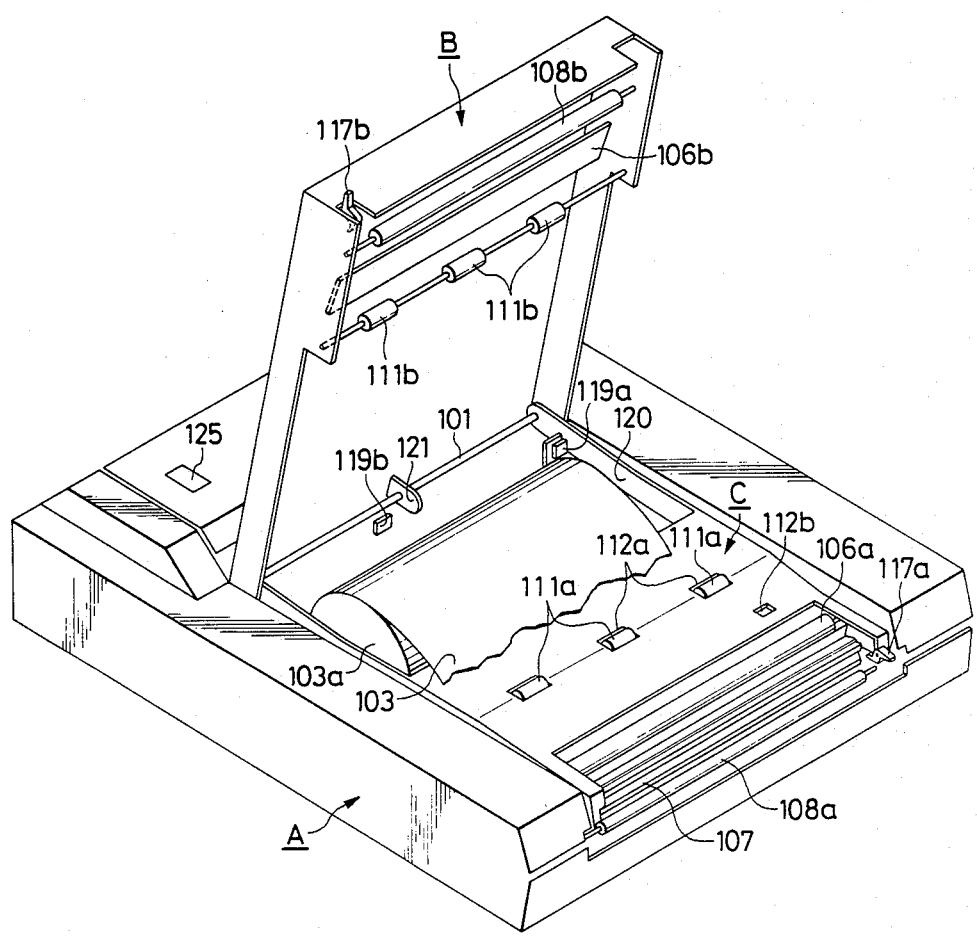
FIGS. 17A and 17B are a perspective view and a cross-sectional view, respectively, illustrating a state in which only the second housing is opened.

Also, of a pair of feed rollers 111a and 111b for conveying the recording sheet 103 contained in the roll holder 105 more distant from the recording station 106 (hereinafter referred to as the "second holder), one feed roller 111a is rotatably provided in the intermediate member C and is designed to be urged against the other feed roller 111b exposed from a cut-away 112a formed in the intermediate member C as shown in FIG. 17A and rotatably provided in the second housing B. Further, in the same manner as previously described, a rotational force is transmitted from a motor 113a provided in the intermediate member C to the feed roller 111a through a pulley 113b and a timing belt 113c, and the other feed roller 111b is designed to follow the driving rotation of the roller 111a. Accordingly, a conveyance path for the recording sheet 103 is formed between the intermediate member C and the second housing B, and the recording sheet 103 ma be conveyed to the recording station 106 by the pair of feed rollers 111aand 111b.

Further, a sheet presence detecting sensor 115a and a sheet width detecting sensor 115b for detecting the presence and size, respectively, of the recording sheet 102 are provided between the pair of feed rollers 109a, 109b and the platen roller 106a with a sheet guide 114 interposed therebetween, the sheet guide 114 being formed integrally with said sheet holders. Also, a sheet presence detecting scnsor 116a and a sheet width detecting sensor 116b for detecting the presence and size, respectively, of the recording sheet 103 through a cut-away 112b in the intermediate member C are provided between the pair of feed rollers 111a, 111b and the recording head 106b.

The first housing A and the intermediate member C may be locked by a lock member 117a, and the intermediate member C and the second housing B may be locked by a lock member 117b. Accordingly, when the second housing B is pivoted with the lock member 117a being in its locking state, only the second housing B is opened from the first housing A and the intermediate member C is locked integrally with the first housing. Also, when the second housing B is pivoted with the lock member 117b being in its locking state, the intermediate member C pivots with the second housing B and is opened from the first housing A.

Further, the lock members 117a and 117b are provided with LEDs (not shown). The LED of the lock member 117a is designed to be turned on and off by the signal from the sheet presence detecting sensor 115a, and the LED of the lock member 117b is designed to be turned on and off by the signal from the sheet presence detecting sensor 116a.

A sheet detecting sensor 118 is also mounted between the cutters 107 and the pair of discharge rollers 108a, 108b, and the LEDs of the respective lock members 117a and 117b are also designed to be turned on and off by the signal from the sensor 118. Of the pair of discharge rollers 108a and 108b, one discharge roller 108a is rotatably provided in the first housing A and is rotatively driven by a motor, not shown, and the other discharge roller 108b is rotatably provided in the second housing B and is urged against the drivingly rotated roller 108b to follow the rotation thereof.

Further, reflection type opening-closing detecting sensors 119a and 119b are provided in the first housing A adjacent to the shaft 101, and one of these sensors, 119a, is designed to irradiate the arm portion 120 of the intermediate member C and the other sensor 119b is designed to irradiate a projected piece 121 secured to the shaft 101 rotatable with the second housing B. Accordingly, when only the second housing B is pivoted, the sensor 119b is turned off to detect it, and when the second housing B and the intermediate member C are pivoted together to open the conveyance path for the recording sheet 102, both sensors 119a and 119b are turned off to detect it.

In FIG. 16, reference numeral 122 designates an original conveying system. Originals 123 placed on an original supporting table 122a formed on top of the second housing B and having their both sides guided by an original side guide 122b may be separated one by one by a separating roller 122c and conveyed leftwardly at a constant speed as viewed in FIG. 16 by a conveyor roller 122d and discharged onto a discharge tray 122f by a discharge roller 122e.

Also, while the original 123 is being conveyed, a light may be applied to the original from the light source 124a of an original reading system 124 and the reflected light therefrom may come to an image reading element 124d such as a CCD via a plurality of mirrors 124b and a lens 124c, whereupon the image of the original 123 may be read and the image signal thereof may be transmitted to a predetermined recording system as in the previously described embodiment.

Operation of the apparatus constructed as described above will now be explained.

When setting the sheet rolls 102a and 103a, the lock members 117a and 117b are both unlocked to open the second housing B and the intermediate member C from the first housing A. Simultaneously therewith, for example, the sheet roll 102a of size A4 is contained into the first holder 104 and the intermediate member C is closed in such a manner that the leading end of that sheet comes closer to the recording station 106 than to the feed roller 109a, whereafter the lock member 117a is locked. Likewise, for example, the sheet roll 103a of size B4 is contained into the second holder 105 and the second housing B is closed in such a manner that the leading end of that sheet comes closer to the recording station 106 than to the feed roller 111a, whereafter the lock member 117b is locked.

After the sheet rolls have been set as described above, manual cutting operation is performed.

The above operation is accomplished as follows. When a start switch 125 is closed, the pair of feed rollers 109a and 109b and the platen roller 106 are rotated in the direction of arrow indicated in FIG. 16 to convey the recording sheet 102 to the cutters 107 and the pair of discharge rollers 108a and 108b. Thereupon, the leading end of the recording sheet is cut by the cutters 107, and the recording sheet thus cut is discharged out of the apparatus. Simultaneously therewith, the leading end of the recording sheet 102 is rewound to a predetermined position nearer to the recording station 106 than to the sheet presence detecting sensor 115, thereby bringing the recording sheet into the standby position. Subsequently, with respect also to the recording sheet 103, the pair of feed rollers 111a, 111b, the platen roller 106a, etc. are operated in a similar manner to thereby cut the leading end of the recording sheet 103, and the leading end of the sheet after cut is rewound to a predetermined position nearer to the recording station 106 than to the sheet presence detecting sensor 116a, thereby bringing the recording sheet into the standby position.

By the above-described manual cutting operation, the leading ends of the recording sheets 102 and 103 are put in order and are brought to the accurate standby positions.

During recording, assuming that an image signal of size A4 has been received, the sheet width detecting sensor 115b detects that the width of the recording sheet 102 is size A4 and at the same time, the pair of feed rollers 109a and 109b are rotated in the direction of arrow indicated in FIG. 16 to thereby convey the recording sheet 102 to the recording station 106. When the leading end of the recording sheet 102 is conveyed to the portion of pressure contact between the platen roller 106a and the recording head 106b, the driving of the feed roller 109b is stopped. Simultaneously therewith, the platen roller 106a is rotated in the direction of arrow indicated in FIG. 16 to thereby convey the recording sheet 102 at a constant speed.

In synchronism with said conveyance, the recording head 106b is heated in response to the image signal and effects image recording on the recording sheet 102. At this time, the pair of feed rollers 109a and 109b are rotated as the recording sheet 102 is conveyed.

When the recording of the received image is terminated in the manner described above, the recording sheet 102 is conveyed to be cut until the trailing end of the image on the recording sheet 102 comes to the position of the cutters 107. Then the recording sheet thus recorded is discharged out of the apparatus by the pair of discharge rollers 108a and 108b and at the same time, the platen roller 106a and the pair of feed rollers 109a and 109b are rotated in the direction opposite to the direction of arrow indicated in FIG. 16, thereby rewinding the leading end of the recording sheet 102 to the standby position.

Where the received image is of size B4, the pair of feed rollers 111a and 111b and the platen roller 106a are driven in the same manner as previously described, whereby recording is effected on the recording sheet 103.

Description will now be made of a case where one of the recording sheets 102 and 103 has become exhausted.

If the color of the recording sheets 102 and 103 is, for example, white, a black band different in light reflectance from white color is inserted in the portion of each sheet which is near the terminal end thereof (about 1 m from the terminal end) and to which the light of the sheet presence detecting sensor 115a, 116a is applied. Accordingly, if the sensor 115a, 116a detects white color, it means the "presence" of the sheet, and if the sensor 115a, 116a detects black color, it means the "absence" of the sheet. When the sensor 115a detects the "absence" of the sheet, the LED of the lock member 117a is turned on and off by the signal from said sensor 115a, and when the sensor 116a detects the "absence" of the sheet, the LED of the lock member 117b is likewise turned on and off.

When, for example, the LED of the lock member 117a is being turned on and off, if the lock member 117a, is unlocked and the apparatus is opened, the second housing B and the intermediate member C are opened as a unit from the first housing A as shown in FIGS. 15A and 15B because the lock member 117b remains locked. Thus, a new sheet roll 102a may be loaded.

When the sheet roll 102a is to be loaded, the recording sheet 103 remains gripped by the pair of feed rollers 111a and 111b and by the detent torque of the motor 113a as shown in FIG. 15B and therefore, when the sheet roll 102a has been interchanged, the standby position of the leading end of the other recording sheet 103 is not affected.

Further, when the second housing B and the intermediate member C are pivoted as a unit to interchange the sheet roll 102a as described above, the opening-closing detecting sensors 119a and 119b are both turned off to detect it. Accordingly, the interchange of the sheet roll 102a can be detected by these sensors and therefore, when the second housing B and the intermediate member C are closed after said interchange and the start switch 125 is closed, the aforedescribed manual cutting operation is performed only for the recording sheet 102 in response to the signal from the sensor 119a, whereby initial setting is done.

Figure 17B:
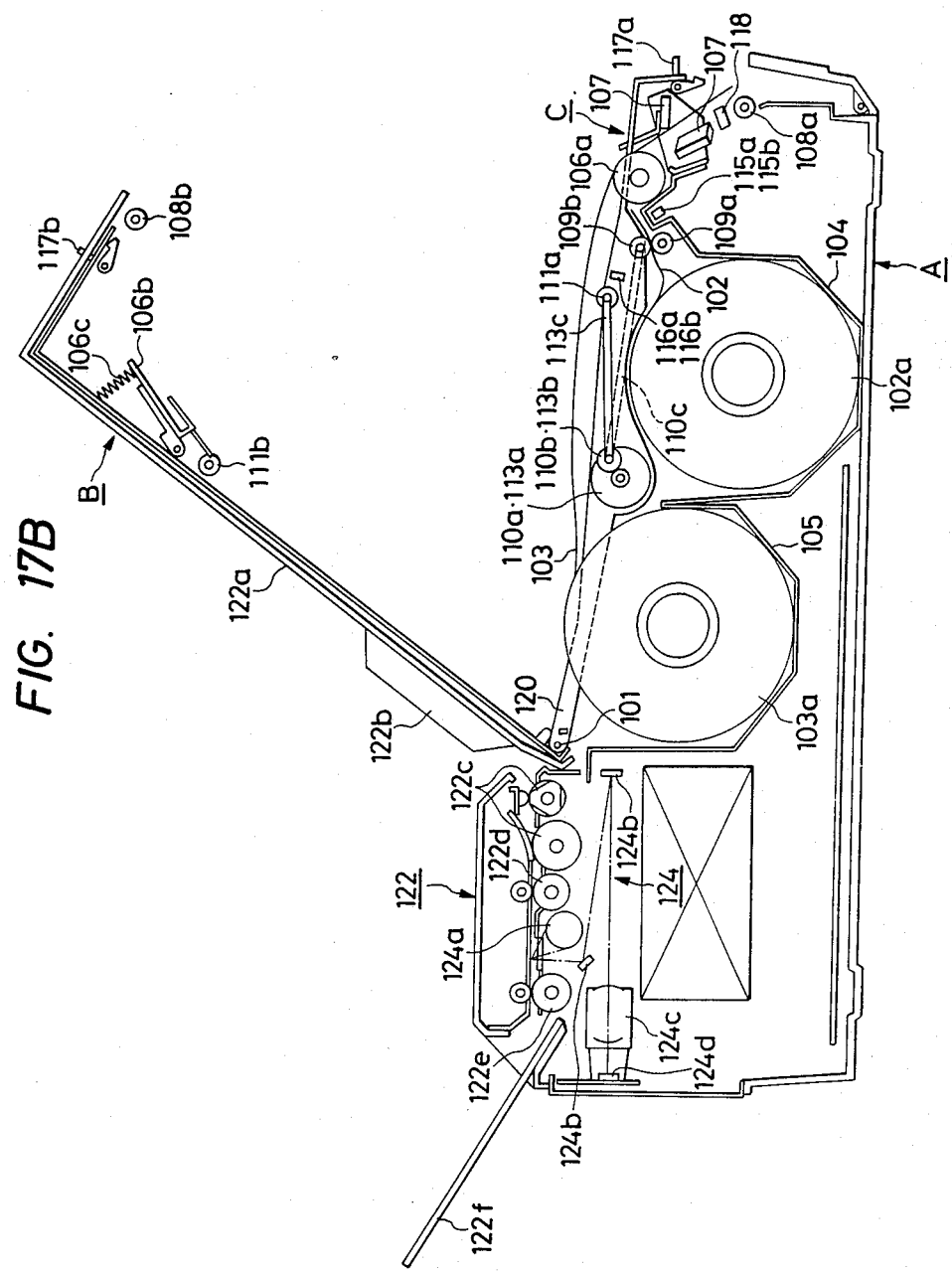

Also, when the LED of the lock member 117b is being turned on and off, if the lock member 117b is unlocked and the second housing B is opened, the intermediate member C keeps itself integral with the first housing A as shown in FIGS. 17A and 17B because the lock member 117a remains locked. Thus, a new sheet roll 103a may be loaded.

Also, when the sheet roll 103a is to be interchanged, the recording sheet 102 remains gripped by the pair of feed rollers 109a and 109b as shown in FIG. 17B as in the previously described case and therefore, the standby position of the leading end of the recording sheet 102 is not affected.

Further, when only the second housing B is opened to interchange the sheet roll 103a as described above, the opening-closing detecting sensor 119b is turned off to detect it. Accordingly, the interchange of the sheet roll 103a can be detected by the sensor 119b and therefore, when the second housing B is closed after the interchange of the roll 103a and the start switch 125 is closed, the aforedescribed manual cutting operation is performed only for the recording sheet 103 in response to the detection signal from said sensor, whereby initial setting is done.

Description will now be made of a case where the recording sheet 102 or 103 has been jammed.

During recording, the pair of feed rollers 109a and 109b or 111a and 111b and the platen roller 106a are driven by a pulse motor, and when the sheet detecting sensor 118 does not detect the recording sheet even if the pulse number is counted and the leading end of the recording sheet is conveyed by an amount corresponding to the pulse number necessary for the leading end of the recording sheet to be conveyed from the recording station 106 to the position of the sheet detecting sensor 118, it is judged that jam has occurred. When jam has occurred while recording is being effected on the recording sheet 102, the LED of the lock member 117a is turned on and off by the signal from the sensor 118, and when jam has occurred while recording is being effected on the recording sheet 103, the LED of the lock member 117b is turned on and off.

Accordingly, as in the case where the sheet roll is interchanged, the lock member whose LED is being turned on and off may be unlocked and the second housing B or the intermediate member C may be opened to process the jam. Again at this time, the recording sheet which is not jam-processed remains gripped by the pair of feed rollers 109a and 109b or 111a and 111b and therefore, the leading end position thereof does not deviate In the present embodiment, as described above, the two set roll sheets have their respective independent conveyance paths. Accordingly, when one of the recording sheets is to be interchanged or jam-processed, even if the conveyance path for that sheet is opened, the conveyance path for the other recording sheet will not be affected. Therefore, the user's operation is simplified.

Further, if a member for locking the first housing and the intermediate member and a member for locking the intermediate member and the second housing are provided so that the user may know the member to be unlocked when the sheet roll is to be interchanged or jam-processed, said operation will be more simplified.

Yet still another embodiment of the present invention will now be described with reference to FIGS. 18 and 19. The present embodiment is applicable to the facsimile apparatus shown in FIGS. 15-17, and the previously described embodiment is invoked for the description of the apparatus.

The embodiment hereinafter described is a facsimile apparatus which has openable-closable first and second housings and in which two sheet rolls each comprising a wound recording sheet are contained and are selectively conveyed to a recording station to effect recording, and wherein a pivotable intermediate member is provided between the first housing and the second housing, a conveyance path for one of the recording sheets is formed between the first housing and the intermediate member, a conveyance path for the other recording sheet is formed between the intermediate member and the second housing and provision is made of means for detecting that the respective conveyance paths have been opened and means for effecting the initial setting of only the set recording sheet in response to the detection.

Thus, according to the embodiment hereinafter described, the two set roll sheets have their respective independent conveyance paths. Accordingly, when one of the recording sheets is to be interchanged or jam-processed, even if the conveyance path for that sheet is opened, the conveyance path for the other recording sheet remains closed and a newly set recording sheet is detected depending on whether this conveyance path has been opened, and when a predetermined switch is closed, initial setting is effected for only said set recording sheet.

Figure 18:
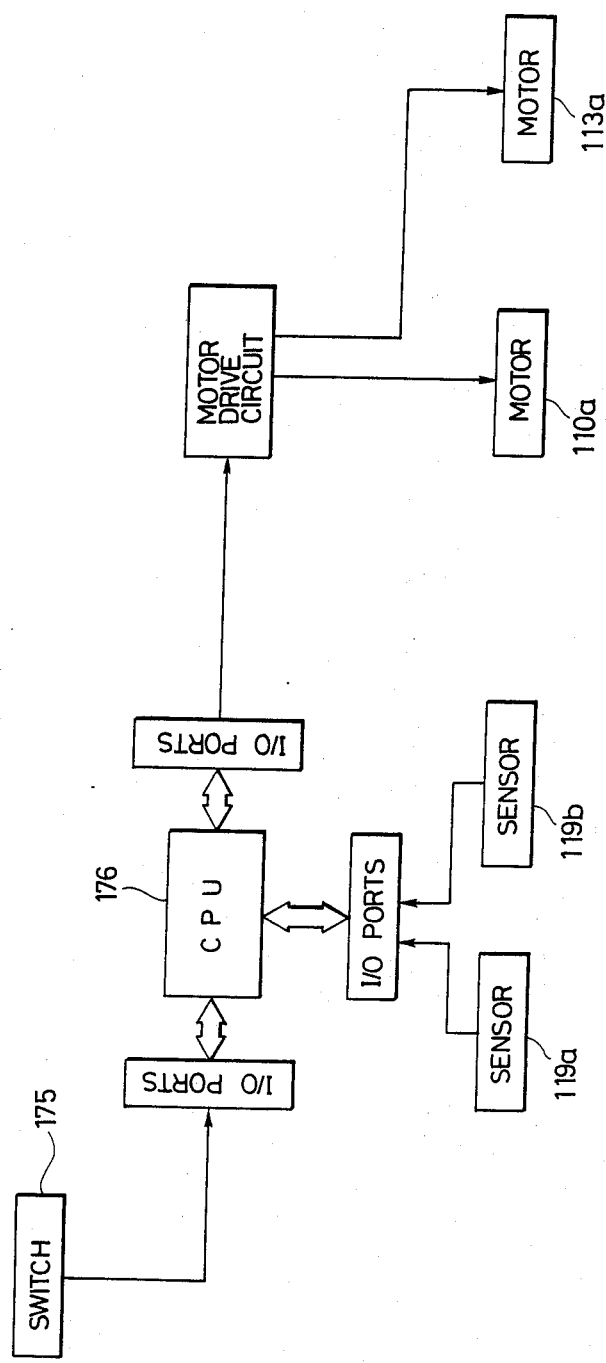
FIG. 18 is a block diagram illustrating means for initially setting only the set recording sheet.
Figure 19:
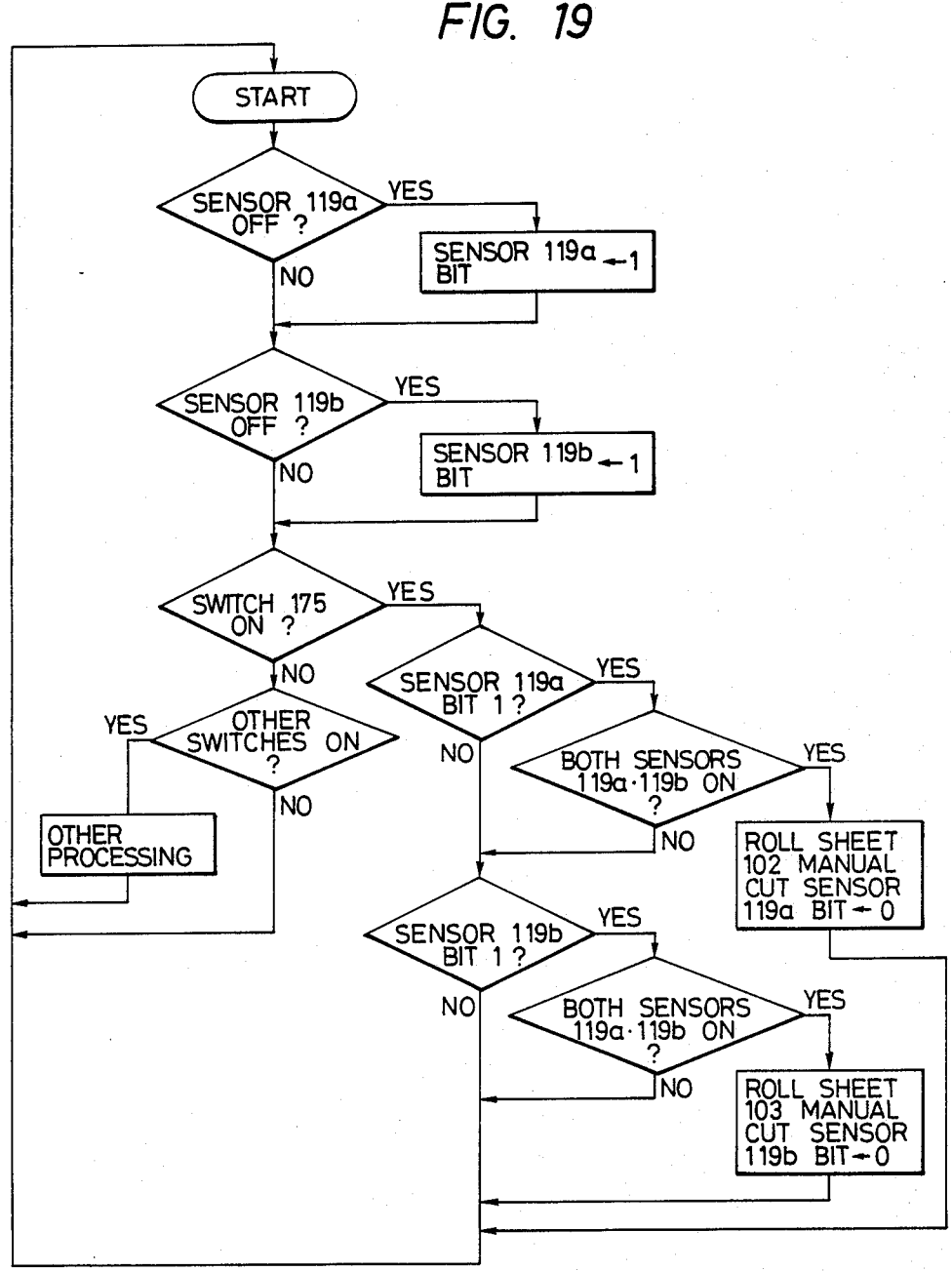
FIG. 19 is a flow chart in which only the set recording sheet is initially set.

In the present embodiment, a start switch 175 operable by the operator is provided to select one of the recording sheets 102 and 103 (FIG. 18). The aforedescribed opening-closing detecting sensors 119a and 119b, as shown in the block diagram of FIG. 18, together with the start switch 175 operable by the operator, are connected to CPU 176 to constitute means for driving the motor 110a or 113a the platen roller 106a and the cutters 107 by a predetermined signal from CPU 176 and effecting the initial setting of the set recording sheet 102 or 103.

Description will now be made of a case where one of the recording sheets 102 and 103 has become exhausted.

If the color of the recording sheets 102 and 103 is, for example, white, a black bard different in light reflectance from white color is inserted in the portion thereof which is near the terminal end thereof (about 1 m from the terminal end) and to which the light of the sheet presence detecting sensors 115a and 116a is applied. Accordingly, if said sensors 115a and 116a are detecting white color, it means the "presence" of the sheet, and if said sensors are detecting black color, it means the "absence" of the sheet. If the sensor 115a detects the "absence" of the sheet, the LED of the lock member 117a will be turned on and off by the signal from the sensor 115a, and if the sensor 116a detects the "absence" of the sheet, the LED of the lock member 117b will be likewise turned on and off.

When, for example, the LED of the lock member 117a is being turned on and off, if this lock member 117a is unlocked and the apparatus is opened, the second housing B and the intermediate member C will be opened as a unit from the first housing A as shown in FIGS. 15A and 15B because the lock member 117b remains locked. Thus, a new sheet roll 102a may be loaded.

When the sheet roll 102a is to be loaded, the recording sheet 103 remains gripped by the pair of feed rollers 111a and 111b as shown in FIG. 15B and therefore, when the sheet roll 102a has been interchanged, the standby position of the leading end of the other recording sheet 103 is not affected.

Further, when the second housing B and the intermediate member C are pivoted as a unit to interchange the sheet roll 102a as described above, the opening-closing detecting sensors 119a and 119b are both turned off to detect it. Accordingly, it can be detected that the conveyance path for the recording sheet 102 has been opened and therefore, as shown in the flow chart of FIG. 19, the second housing B and the intermediate member C are closed after the interchange of the sheet roll 102a and the sensors 119a and 119b are turned on, and when the switch 175 is closed, the aforedescribed manual cutting operation is perforated for only the recording sheet 102 in response to the signal from the CPU 176, whereby the initial setting of the recording sheet 102 is done. At this time, the initial setting of the other recording sheet 103 does not take place.

Also, when the LED of the lock member 117b is being turned on and off, if the lock member 117b is unlocked and the second housing B is opened, the intermediate member C remains integral with the first housing A as shown in FIGS. 17A and 17B because the lock member 117a remains locked. Thus, a new sheet roll 103a may be loaded.

Also, when the sheet roll 103a is to be interchanged, the recording sheet 102 remains gripped by the pair of feed rollers 109a and 109b as shown in FIG. 17B as in the previously described case and therefore, the standby position of the leading end of the recording sheet 102 is not affected.

Further, when the second housing B is pivoted to interchange the sheet roll 103a as described above, only the opening-closing detecting sensor 119b is turned off to detect it. Accordingly, it can be detected that the conveyance path for the recording sheet 103 has been opened and therefore, when as shown in the block diagram of FIG. 18, the second housing B is closed after the interchange of the sheet roll 103a to turn on the sensors 119a and 119b and the start switch 175 is closed, the aforedescribed manual cutting operation is performed for only the recording sheet 103 in response to the signal from the CPU 176, and the initial setting of the recording sheet 103 is done. At this time, the initial setting of the other recording sheet 102 does not take place.

According to the present embodiment, as described above, the two set roll sheets have their respective independent conveyance paths, and which of the recording sheets has been interchanged or jam-processed can be detected by detecting whether said paths have been opened. Accordingly, initial setting can be automatically effected for only the set recording sheet, and the user's operation can be simplified.

Each of the above embodiments has been described with respect to a case where two sheet rolls have been loaded, whereas the present invention is not restricted thereto, but is suitably applicable to apparatuses which can be loaded with more than two recording sheet rolls. Also, the present invention is not restricted to facsimile apparatuses, but are suitably applicable, for example, to copying apparatuses or printers.

As described above in detail, the present invention can improve the operability of recording apparatuses which can be loaded with a plurality of rolled recording sheets.

We claim:

1. A recording apparatus having:
    recording means for recording an image corresponding to image information on a recording sheet;
    a first housing;
    a second housing openable relative to said first housing;
    a first loading portion provided in said first housing and enabling a first rolled recording sheet to be loaded thereinto;
    a second loading portion provided in said first housing and enabling a second rolled recording sheet to be loaded thereinto;
    first conveying means provided in said first housing for conveying the recording sheet loaded into said first loading portion; and
    second conveying means provided in said second housing for conveying the recording sheet loaded into said second loading portion.

2. A recording apparatus according to claim 1, wherein drive means for driving said conveying means is provided in said first housing.

3. A recording apparatus according to claim 1, wherein said conveying means have a pair of rollers, one of which is provided on the first housing side and the other roller is provided on the second housing side.

4. A recording apparatus having:
    recording means for recording an image corresponding to image information or a recording sheet;
    a first loading portion enabling a first rolled recording sheet to be loaded thereinto;
    a second loading portion enabling a second rolled recording sheet to be loaded thereinto;
    a first housing;
    a second housing openable relative to said first housing;
    an intermediate member provided between said first housing and said second housing;
    a first conveyance path for said first rolled recording sheet provided between said first housing and said intermediate member; and
    a second conveyance path for said second rolled recording sheet provided between said second housing and said intermediate member.

5. A recording apparatus according to claim 4, further having a lock member for locking said first housing and said intermediate member.

6. A recording apparatus according to claim 4, further having a lock member for locking said second housing and said intermediate member.

7. A recording apparatus according to claim 4, wherein a feed member for conveying said first and second recording sheets is provided in said intermediate member.

8. A recording apparatus according to claim 7, wherein said feed member is comprised of two pairs of rollers, two drive rollers of said pairs of rollers are provided in said intermediate member, one of the rollers urged against and following said drive rollers is provided in said first housing, and the other roller is provided in said second housing.

9. A recording apparatus according to claim 4, wherein means for detecting that said conveyance paths have been opened and means for effecting the initial setting of only the set recording sheet in response to said detection are provided.

10. A recording apparatus having:
a first housing;
a second housing openable relative to said first a first loading portion provided in said first housing and enabling a first rolled recording sheet to be loaded thereinto;
a second loading portion provided in said first housing and enabling a second rolled recording sheet to be loaded thereinto;
first conveying means provided in said first housing for conveying the recording sheet loaded into said first loading portion;
second conveying means provided in said second housing for conveying the recording sheet loaded into said second loading portion;
recording means provided in one of said first and second housings for recording an image corresponding to image information on said recording sheet; and
a platen provided in the other housing than the housing in which said recording means is provided.

11. A recording apparatus according to claim 10, wherein said conveying means have a pair of rollers, one of which is provided on the first housing side and the other roller is provided on the second housing side.

12. A recording apparatus according to claim 10, wherein the rotational speed of said platen before the leading end of said recording sheet comes to the recording position by said recording means during recording is controlled so as to be lower than the maximum rotational speed of said platen during recording.

13. A recording apparatus comprising:
recording means for recording an image on a recording sheet in response to image information;
a first housing;
a second housing openable relative to said first housing;
a first loading section disposed on said first housing and capable of loading a first roll-like recording sheet; and
a second loading section disposed on said first housing and capable of loading a second roll-like recording sheet,
wherein said second housing has a first rotating member and a second rotating member for cooperatively conveying the first roll-like sheet loaded on said first loading section, and wherein said first housing has a third rotating member and second housing has a fourth rotating member, said third and fourth rotating members cooperatively conveying the second roll-like sheet loaded on said second loading section.

14. A recording apparatus according to claim 13, wherein said first and second rotating members are constituted as a pair of rollers.

15. A recording apparatus according to claim 13, herein said third and fourth rotating members are constituted as a pair of rollers.

16. A recording apparatus according to claim 13, wherein said first and second housings are openable relative to each other by relative motion about an axis, and wherein said first loading section is provided to one side of said axis, said first and second housings being to said one side of said axis and being relatively openable in respect of said second loading section.

17. A recording apparatus according to claim 13, wherein said second loading section is provided toward a side of said first and second housings at which said housings separate from each other to open.

18. A recording apparatus according to claim 13, wherein a leading end of the first roll-like sheet positions at said second housing and a leading end of the second roll-like sheet positions at said first housing when said first and second housings are opened.

19. A recording apparatus according to claim 13, wherein said second loading section and said first loading section are provided successively from a side of said first and second housings at which said housings separate from each other to open, and wherein a leading end of the first roll-like sheet is at said second housing, positioned upward, and a leading end of the second roll-like sheet is at said first housing, positioned downward, when said first and second housings are open.

20. A recording apparatus according to claim 13, wherein said first and second rotating members sandwich a leading end of the first roll-like sheet when said second housing is opened upward in respect of said first housing.

21. A recording apparatus according to claim 1, 4, 10 or 13 further comprising means for reading a manuscript image, and wherein said apparatus is a facsimile machine.

22. A recording apparatus according to claim 1, 10 or 13, wherein drive sources for driving said conveying means and said platen are provided independently of each other.

23. A recording apparatus according to claim 1, 10 or 13 wherein the conveyance speed of the recording sheet by the feed member is higher than the conveyance sped of the recording sheet by the platen.

24. A recording apparatus according to claim 1 or 10 wherein the leading end of said one of the recording sheets is conveyed to a recording station by said conveying means within the procedure time from after the width size of received image information has been detected until the image information comes to the recording station.

* * * * *

UNITED STATES PATENT AND TRADEMARK OFFICE
CERTIFICATE OF CORRECTION

PATENT NO. : 4,849,824
DATED : July 18, 1989
INVENTOR(S) : KENKICHI SAKURAGI, ET AL.

It is certified that error appears in the above-identified patent and that said Letters Patent is hereby corrected as shown below:

COLUMN 1

Line 16, "desk, top" should read --desktop--.
    Line 22, "above -described" should read --above-described--.

COLUMN 2

Line 9, "state" should read --a state--.
    Line 41, "sheet. FIG. 19" should read --sheet. ¶ FIG. 19--.
    Line 50, "in" (first occurrence) should read --is--.

COLUMN 3

Line 13, "first." should read --first--.

COLUMN 9

Line 52, "period T" should read --period $T_1$--.

COLUMN 10

Line 14, "speed N" should read --speed $N_1$--.

COLUMN 11

Line 27, "(step 10)," should read --(step S10),--.
    Line 53, "the rewound" should read --be rewound--.

UNITED STATES PATENT AND TRADEMARK OFFICE
CERTIFICATE OF CORRECTION

PATENT NO. : 4,849,824
DATED : July 18, 1989
INVENTOR(S) : KENKICHI SAKURAGI, ET AL.

It is certified that error appears in the above-identified patent and that said Letters Patent is hereby corrected as shown below:

COLUMN 15

Line 43, "the urged" should read --be urged--.
Line 58, "first holder)," should read --"first holder"),--.
Line 59, "L" should be deleted.

COLUMN 16

Line 6, "second holder)," should read --"second holder"),--.
Line 20, "ma" should read --may--.
Line 22, "111aand" should read --111a and--.

COLUMN 20

Line 52, "113a" should read --113a,--.
Line 59, "black bard" should read --black band--.

COLUMN 21

Line 30, "perforated" should read --performed--.

COLUMN 22

Line 9, "are" should read --is--.
Line 43, "or" should read --on--.

UNITED STATES PATENT AND TRADEMARK OFFICE
CERTIFICATE OF CORRECTION

PATENT NO. : 4,849,824
DATED : July 18, 1989
INVENTOR(S) : KENKICHI SAKURAGI, ET AL.

Page 3 of 3

It is certified that error appears in the above-identified patent and that said Letters Patent is hereby corrected as shown below:

COLUMN 23

Line 15, "first a" should read --first housing; ¶ a--.
Line 38, "claim 10," should read --claim 1 or 10,--.
Line 60, "and second" should read --and said second--.

COLUMN 24

Line 9, "herein" should read --wherein--.
Line 42, "13" should read --13,--.
Line 50, "13" should read --13,--.
Line 51, "sped" should read --speed--.
Line 53, "10" should read --10,--.

Signed and Sealed this

Twenty-eighth Day of August, 1990

Attest:

HARRY F. MANBECK, JR.

*Attesting Officer*   *Commissioner of Patents and Trademarks*